US008268197B2

(12) United States Patent
Singh et al.

(10) Patent No.: US 8,268,197 B2
(45) Date of Patent: Sep. 18, 2012

(54) SOLID ELECTROLYTE MATERIAL MANUFACTURABLE BY POLYMER PROCESSING METHODS

(75) Inventors: Mohit Singh, Berkeley, CA (US); Ilan Gur, San Francisco, CA (US); Hany Basam Eitouni, Berkeley, CA (US); Nitash Pervez Balsara, El Cerrito, CA (US)

(73) Assignee: Seeo, Inc., Hayward, CA (US)

( * ) Notice: Subject to any disclaimer, the term of this patent is extended or adjusted under 35 U.S.C. 154(b) by 751 days.

(21) Appl. No.: 12/271,829

(22) Filed: Nov. 14, 2008

(65) Prior Publication Data

US 2009/0075176 A1    Mar. 19, 2009

Related U.S. Application Data

(63) Continuation-in-part of application No. 12/225,934, filed as application No. PCT/US2007/008435 on Apr. 3, 2007.

(60) Provisional application No. 60/988,085, filed on Nov. 14, 2007, provisional application No. 60/744,243, filed on Apr. 4, 2006, provisional application No. 60/820,331, filed on Jul. 25, 2006.

(51) Int. Cl.
*H01B 1/12* (2006.01)
*B32B 7/04* (2006.01)

(52) U.S. Cl. ............ 252/520.2; 252/521.3; 252/518.1; 252/500; 429/309; 429/122; 428/420; 428/424.2; 428/424.4; 428/424.8; 428/413; 428/414; 428/447; 428/448

(58) Field of Classification Search .......... 252/520.2, 252/521.3, 518.1, 500; 429/309, 122; 428/420, 428/424.2, 424.4, 424.8, 413, 414, 447, 448
See application file for complete search history.

(56) References Cited

U.S. PATENT DOCUMENTS

| | | | |
|---|---|---|---|
| 3,355,513 A * | 11/1967 | Sadron et al. ............... 525/279 |
| 3,711,412 A | 1/1973 | Sawyer | |
| 4,311,566 A | 1/1982 | McCann | |
| 4,582,876 A | 4/1986 | Weemes | |
| 4,657,833 A * | 4/1987 | Hadley et al. ............... 430/52 |
| 5,013,619 A | 5/1991 | Cook | |
| 5,196,484 A | 3/1993 | Giles | |
| 5,219,681 A | 6/1993 | Yamada et al. | |
| 5,523,180 A | 6/1996 | Armand | |
| 5,622,792 A | 4/1997 | Brochu | |
| 5,639,574 A | 6/1997 | Hubbard | |
| 5,658,685 A | 8/1997 | Oliver | |
| 6,096,234 A | 8/2000 | Nakanishi | |
| 6,322,924 B1 | 11/2001 | Hirahara | |
| 6,361,901 B1 | 3/2002 | Mayes | |
| 6,428,933 B1 | 8/2002 | Christensen et al. | |
| 6,537,704 B1 | 3/2003 | Akashi | |
| 6,673,273 B2 * | 1/2004 | Ba Le et al. ............... 252/511 |
| 6,743,550 B2 | 6/2004 | Gan | |
| 6,749,961 B1 | 6/2004 | Nguyen et al. | |
| 6,835,495 B2 | 12/2004 | Michot | |
| 6,841,601 B2 * | 1/2005 | Serpico et al. ............... 524/261 |
| 7,026,071 B2 | 4/2006 | Mayes | |
| 7,282,302 B2 | 10/2007 | Visco | |
| 7,315,106 B2 | 1/2008 | Asaka | |
| 7,318,982 B2 | 1/2008 | Gozdz | |
| 2003/0094599 A1 * | 5/2003 | Le et al. ................... 252/500 |
| 2004/0151985 A1 | 8/2004 | Munshi | |
| 2005/0034993 A1 * | 2/2005 | Gozdz et al. ............... 205/57 |
| 2005/0181254 A1 * | 8/2005 | Uensal et al. .............. 429/33 |
| 2005/0221193 A1 * | 10/2005 | Kinouchi et al. ............ 429/306 |
| 2005/0256256 A1 | 11/2005 | Muramoto et al. | |
| 2006/0270822 A1 | 11/2006 | Norsten | |
| 2006/0289405 A1 | 12/2006 | Oberste-Berghaus | |
| 2009/0104523 A1 | 4/2009 | Mullin et al. | |
| 2009/0263725 A1 * | 10/2009 | Balsara et al. ............. 429/322 |
| 2011/0033755 A1 * | 2/2011 | Eitouni et al. ............ 429/310 |

FOREIGN PATENT DOCUMENTS

| | | |
|---|---|---|
| DE | 297281 A5 | 1/1992 |
| EP | 1 553 117 A1 | 7/2005 |
| JP | 2006-036925 | 2/2006 |
| WO | 88/03154 | 5/1988 |
| WO | 88 03154 A | 5/1988 |
| WO | 2007/113236 A1 | 10/2007 |
| WO | 2007/142731 | 12/2007 |
| WO | 2010039606 | 8/2010 |

OTHER PUBLICATIONS

Takeshi Niitani, Mikiya Shimada, Kiyoshi Kawamura, Kiyoshi Kanamura, "Characteristics of new-type solid polymer electrolyte controlling nanostructure," Journal of Power Sources 146 (2005) 386-390.

Thomas H. Epps, III, Travis S. Bailey, Hoai D. Pham, and Frank S. Bates, "Phase Behavior of Lithium Perchlorate-Doped Poly(styrene-b-isoprene-b-ethylene oxide) Triblock Copolymers," Chem. Mater. 2002, 14, 1706-1714.

Philip P. Soo, Biying Huang, Young-Il Jang, Yet-Ming Chiang, Donald R. Sadoway, and Anne M. Mayes, Rubbery Block Copolymer Electrolytes for Solid-State Rechargeable Lithium Batteries, Journal of the Electrochemical Society, 146 (1) 32-37 (1999).

(Continued)

*Primary Examiner* — Douglas McGinty
(74) *Attorney, Agent, or Firm* — R'Sue Popowich Caron

(57) ABSTRACT

The present invention relates generally to electrolyte materials. According to an embodiment, the present invention provides for a solid polymer electrolyte material that is ionically conductive, mechanically robust, and can be formed into desirable shapes using conventional polymer processing methods. An exemplary polymer electrolyte material has an elastic modulus in excess of $1 \times 10^6$ Pa at 90 degrees C. and is characterized by an ionic conductivity of at least $1 \times 10^{-5}$ Scm-1 at 90 degrees C. An exemplary material can be characterized by a two domain or three domain material system. An exemplary material can include material components made of diblock polymers or triblock polymers. Many uses are contemplated for the solid polymer electrolyte materials. For example, the present invention can be applied to improve Li-based batteries by means of enabling higher energy density, better thermal and environmental stability, lower rates of self-discharge, enhanced safety, lower manufacturing costs, and novel form factors.

45 Claims, 25 Drawing Sheets

OTHER PUBLICATIONS

Mohit Singh, Lola Odusanya, Nitash Balsara, Abstract "Performance of Nanostructured Polymer Electrolytes in Li Batteries," presented at Mar. 2006 APS Meeting, Mar. 14, 2006.

Mohit Singh, Lola Odusanya, Nitash Balsara, "Nanostructured polymer electrolytes: Decoupling ion conduction and mechanical properties," presented Sep. 13, 2006 (abstract available online Jul. 17, 2006), ACS Meeting, San Francisco.

Lola Odusanya, Mohit Singh, Nitash Balsara, "Synthesis and Characterization of Nanostructured Polymer Electrolytes," Poster at BATT Review Meeting, Lawrence Berkeley National Laboratory, Jun. 1, 2005.

Lola Odusanya, Mohit Singh, Nitash Balsara, "Synthesis and Characterization of Polymer and Gel Electrolytes," presented at BATT Review Meeting, Lawrence Berkeley National Laboratory, Jun. 1, 2005.

Nitash Balsara, Mohit Singh, Lola Odusanya, "Nanostructured Polymer Electrolytes with High Conductivity and Elastic Modulus for Li ion Batteries," presented at 207th ECS Meeting, Quebec, May 15, 2005.

Mohit Singh, et al., "Effect of Molecular Weight on the Mechanical and Electrical Properties of Block Copolymer Electrolytes," Macromolecules 2007, 40, 4578-4585.

Hany Eitouni, et al., "Opportunities and Challenges in Polymer Nanoscience," presented at Oak Ridge National Laboratory, May 23, 2005.

Ishrat M. Khan, Daryle Fish, Yadollah Delaviz, Johannes SMID, "ABA Triblock comb copolymers with oligo(oxyethylene) side chains as matrix for ion transport," Makromol. Chem. 190, 1069-1078 (1989).

P. Lobitz, A. Reiche and H. Fullbier, "Block copolymers of poly(ethylene oxide) materials for polymer electrolytes (transport properties)," Journal of Power Sources, 43-44 (1993) 467-472.

* cited by examiner

Conductivity at 80°C for r = 0.085

Total molecular weight of diblock = 350 Kg/mol r = 0.085

SOLID ELECTROLYTE MATERIAL MANUFACTURABLE BY POLYMER PROCESSING METHODS

CROSS-REFERENCE TO RELATED APPLICATIONS

This application claims priority to U.S. Provisional Patent Application 60/988,085, filed Nov. 14, 2007, which is incorporated by reference herein. This application is a continuation-in-part of U.S. patent application Ser. No. 12/225,934, filed Jun. 19, 2009, which is a national phase application of PCT Application Number PCT/US2007/008435, filed Apr. 3, 2007, which claims priority to U.S. Provisional Patent Application No. 60/744,243, filed Apr. 4, 2006 and U.S. Provisional Patent Application No. 60/820,331, filed Jul. 25, 2006, all of which are incorporated by reference herein.

STATEMENT OF GOVERNMENT SUPPORT

The invention described and claimed herein was made in part utilizing funds supplied by the U.S. Department of Energy under Contract No. DE-AC02-05CH11231. The Government has certain rights in this invention.

BACKGROUND OF THE INVENTION

The present invention relates generally to electrolyte materials. More particularly, the present invention relates to solid polymer electrolyte materials that are ionically conductive, mechanically robust, and manufacturable by conventional polymer processing methods. Merely by way of illustration, an exemplary polymer electrolyte material has an elastic modulus in excess of $1 \times 10^6$ Pa at 25 degrees C. and is characterized by an ionic conductivity of at least $1 \times 10^{-5}$ Scm$^{-1}$ at 90 degrees C. Many uses are contemplated for the solid polymer electrolyte materials. By way of example, the present invention can be applied to improve Li-based batteries by means of enabling higher energy density, better thermal and environmental stability, lower rates of self-discharge, enhanced safety, lower manufacturing costs, and novel form factors.

The demand for rechargeable batteries has grown by leaps and bounds as the global demand for technological products such as cellular phones, laptop computers and other consumer electronic products has escalated. In addition, interest in rechargeable batteries has been fueled by current efforts to develop green technologies such as electrical-grid load leveling devices and electrically-powered vehicles, which are creating an immense potential market for rechargeable batteries with high energy densities.

Li-ion batteries represent one of the most popular types of rechargeable batteries for portable electronics. Li-ion batteries offer high energy and power densities, slow loss of charge when not in use, and they do not suffer from memory effects. Because of many of their benefits, including their high energy density, Li-ion batteries have also been used increasingly in defense, aerospace, back-up storage, and transportation applications.

The electrolyte is an important part of a typical Li-ion rechargeable battery. Traditional Li-ion rechargeable batteries have employed liquid electrolytes. An exemplary liquid electrolyte in Li-ion batteries consists of lithium-salt electrolytes, such as $LiPF_6$, $LiBF_4$, or $LiClO_4$, and organic solvents, such as an alkyl carbonate. During discharging, the electrolyte may serve as a simple medium for ion flow between the electrodes, as a negative electrode material is oxidized, producing electrons, and a positive electrode material is reduced, consuming electrons. These electrons constitute the current flow in an external circuit.

While liquid electrolytes dominate current Li-based technologies, solid electrolytes may constitute the next wave of advances for Li-based batteries. The lithium solid polymer electrolyte rechargeable battery is an especially attractive technology for Li-ion batteries because, among other benefits, the solid polymer electrolyte exhibits high thermal stability, low rates of self-discharge, stable operation over a wide range of environmental conditions, enhanced safety, flexibility in battery configuration, minimal environmental impacts, and low materials and processing costs. Moreover, solid polymer electrolytes may enable the use of lithium metal anodes, which offer higher energy densities than traditional lithium ion anodes.

Lithium batteries with solid electrolytes function as follows. During charging, a voltage applied between the electrodes of a battery causes lithium ions and electrons to be withdrawn from lithium hosts at the battery's positive electrode. Lithium ions flowing from the positive electrode to the battery's negative electrode through a polymer electrolyte are reduced at the negative electrode. During discharge, the opposite reaction occurs. Lithium ions and electrons are allowed to re-enter lithium hosts at the positive electrode as lithium is oxidized at the negative electrode. This energetically favorable, spontaneous process converts chemically stored energy into electrical power that an external device can use.

Polymeric electrolytes have been the subject of academic and commercial battery research for several years. Polymer electrolytes have been of exceptional interest partly due to their low reactivity with lithium and potential to act as a barrier to the formation of metallic lithium filaments (or dendrites) upon cycling.

According to one example, polymer electrolytes are formed by incorporating lithium salts into appropriate polymers to allow for the creation of electronically insulating media that are ionically conductive. Such a polymer offers the potential to act both as a solid state electrolyte and separator in primary or secondary batteries. Such a polymer can form solid state batteries that exhibit high thermal stability, low rates of self-discharge, stable operation over a wide range of environmental conditions, enhanced safety, and higher energy densities as compared with conventional liquid-electrolyte batteries.

Despite their many advantages, the adoption of polymer electrolytes has been curbed by the inability to develop an electrolyte that exhibits both high ionic conductivity and good mechanical properties. This difficulty arises because high ionic conductivity, according to standard mechanisms, calls for high polymer chain mobility. But high polymer chain mobility, according to standard mechanisms, tends to produce mechanically soft polymers.

As an example, a prototypical polymer electrolyte is one composed of polyethylene oxide (PEO)/salt mixtures. PEO generally offers good mechanical properties at room temperature. However, PEO is also largely crystalline at room temperature. The crystalline structure generally restricts chain mobility, reducing conductivity. Operating PEO electrolytes at high temperature (i.e., above the polymer's melting point) solves the conductivity problem by increasing chain mobility and hence improving ionic conductivity. However, the increased conductivity comes at a cost in terms of deterioration of the material's mechanical properties. At higher temperatures, the polymer no longer behaves as a solid.

In general, attempts to stiffen PEO, such as through addition of hard colloidal particles, increasing molecular weight, or cross-linking, have been found to also cause reduced ionic conductivity. Similarly, attempts to increase the conductivity of PEO, such as through addition of low molecular weight plasticizers, have led deterioration of mechanical properties.

Therefore, there has been and is still a strong need for a polymeric electrolyte material with high ionic conductivity and mechanical stability where the material is amenable to standard high-throughput polymer processing methods.

BRIEF SUMMARY OF THE INVENTION

The present invention relates generally to electrolyte materials. More particularly, the present invention relates to solid polymer electrolyte materials that are ionically conductive, mechanically robust, and can be formed into desirable shapes using conventional polymer processing methods. Merely by way of illustration, an exemplary polymer electrolyte material has an elastic modulus in excess of $1\times10^6$ Pa at 25 degrees C. and is characterized by an ionic conductivity of at least $1\times10^{-5}$ Scm$^{-1}$ at 90 degrees C. Many uses are contemplated for the solid polymer electrolyte materials. By way of examples, the present invention can be applied to improve Li-based batteries by means of enabling higher energy density, better thermal and environmental stability, lower rates of self-discharge, enhanced safety, lower manufacturing costs, and novel form factors.

According to an embodiment, the present invention provides a rigid, ionically conductive polymeric electrolyte material that may be processed by means of high-throughput or industrial processing techniques. The unique and novel properties of the material stem in part from morphological features of the polymer domains, determined in part by the molecular arrangements within the material.

According to the embodiment, the material enables large-scale processing and production of an ionically conductive, yet mechanically stable electrolyte that may be used in lithium metal or lithium ion batteries. In lithium-based batteries the material can afford high thermal stability, low rates of self-discharge, stable operation over a wide range of environmental conditions, improved cycle life, enhanced safety, and/or higher energy densities as compared with conventional liquid-electrolytes.

According to an embodiment, a polymer electrolyte containing two primary phases of at least two disparate polymeric materials is provided. An exemplary material system includes a conductive domain and a structural domain. The structural domain and the conductive domain are made of different polymers and may be arranged in layered structures. In a specific embodiment, the domains are arranged in a lamellar structure where the domains are arranged in layers. In another specific embodiment, the domains are arranged in a perforated lamellar structure where one layer extends into perforations in another layer of the lamellar structure, and where the perforating of one layer by another may help to impede the formation of crystalline structures.

According to a specific embodiment, the electrolyte is characterized by a two domain morphology and is made of linear diblock or triblock copolymers. An exemplary material contains conductive and structural phases in a morphology that leads to a mechanically unique and favorable bonding configuration to offer unique properties. According to an embodiment, the processibility of the material is improved through enhanced mechanical properties, such as increased yield strain and increased impact strength.

According to an embodiment, the electrolyte is characterized by a three-domain morphology and is made of linear triblock copolymers. An exemplary material system includes two primary phases forming a conductive and a structural domain and an additional third disparate polymer material forming a third domain. According to an embodiment, the third domain helps to improve the processibility of the materials by enhancing the mechanical properties, such as increasing yield strain and increasing impact strength and toughness of the material. According to the embodiment, a third domain also serves to impede the formation of crystalline phases in the conductive domain, enhancing the conductivity properties of the material.

According to an embodiment, a conductive linear polymer block making up a conductive domain is a polyether. In one arrangement, the linear polymer block making up a conductive domain is polyethylene oxide. In another arrangement, the conductive linear polymer block is a polyamine. In one arrangement, the conductive linear polymer block is a linear copolymer. In one arrangement, the linear copolymer contains an ether.

According to an embodiment, a structural polymer block making up a structural domain is selected from a group including non-ionic-conducting polymers characterized by a bulk modulus of greater than $10^6$ Pa at 90 degrees C. The structural polymer block can be selected from a group including polystyrene, polymethacrylate, polyvinylpyridine, polyvinylcyclohexane, polyimide, polyamide, and polypropylene. The structural polymer block can include a component selected from a group comprising styrene, methacrylate, vinylpyridine, vinylcyclohexane, imide, amide, and propylene. In one arrangement, the structural polymer block is polystyrene. In one arrangement, the structural polymer block is polymethacrylate. In one arrangement, the structural polymer block is polyvinylpyridine. In one arrangement, the structural polymer block is polyvinylcyclohexane. In one arrangement, the structural polymer block is polyimide. In one arrangement, the structural polymer block is polyamide. In one arrangement, the structural polymer block is polypropylene.

According to an embodiment, a third polymer block making up a third domain is a rubbery polymer. A rubbery polymer can increase the toughness of the block copolymer, making it less brittle or friable. The third polymer block can be a polysiloxane, such as polydimethylsiloxane. The third polymer block can also be a polyacrylate, such as poly(2-ethylhexyl acrylate), polydecyl methacrylate, or polylauryl methacrylate. The third polymer block can also be a polydiene, such as polyisoprene and polybutadiene.

Other details and other embodiments of the current invention involving material systems for a solid electrolyte material that is ionically conductive, mechanically robust, and manufacturable by conventional polymer processing methods are described throughout this disclosure. While these inventions have been described in the context of the above specific embodiments, a person of skill in the art will recognize that other modifications and variations are possible. Accordingly, the scope and breadth of the present invention should not be limited by the specific embodiments described herein and should instead be determined by the following claims and their full extent of equivalents.

BRIEF DESCRIPTION OF THE DRAWINGS

It should be understood that the drawings are not drawn to scale and are intended only to help the reader in understanding the embodiment of the invention.

DETAILED DESCRIPTION OF THE INVENTION

Embodiments of the present invention relate generally to electrolyte materials. More particularly, the embodiments relate to solid polymer electrolyte materials that are ionically conductive, mechanically robust, and manufacturable by conventional polymer processing methods. Merely by way of illustration, an exemplary polymer electrolyte material has an elastic modulus in excess of $1 \times 10^6$ Pa at 25 degrees C. and is characterized by an ionic conductivity of at least $1 \times 10^{-5}$ Scm$^{-1}$ at 90 degrees C. Many uses are contemplated for the solid polymer electrolyte materials. By way of example, the present invention can be applied to improve Li-based batteries by means of enabling higher energy density, better thermal and environmental stability, lower rates of self-discharge, enhanced safety, lower manufacturing costs, and novel form factors.

The current invention includes solid polymeric electrolyte materials. According to an embodiment, the material includes unique molecular architectures and unique morphological features. In general, specific morphological features of a solid electrolyte material can arise depending on processing as well as the specific composition, volume fraction, and molecular architectures of the particular coexisting phases of polymers.

According to an embodiment, a solid polymer electrolyte material is characterized by a two-domain morphology with one domain being a conductive domain and the other domain being a structural domain. An exemplary solid polymer electrolyte may also include a three-domain morphology with a first domain being a conductive domain, a second domain being a structural domain, and a third domain interspersed between the conductive domain and the structural domain.

Lamellae of the conductive domains provide pathways for ion conduction through a bulk electrolyte material. Perforations in the conductive lamellae may serve as an impediment to crystallization and enhance the conductivity of the conductive domains. Lamellae of the structural domains provide sufficient support to confer structural stability to a bulk electrolyte material. Optional additional domains of a third, minor phase may serve to increase the yield strain or impact strength of a bulk electrolyte material. In addition, domains of a third, minor phase may serve as an impediment to crystallinity of the conductive domains and thereby enhance conductivity of a bulk electrolyte material.

Figure 1:
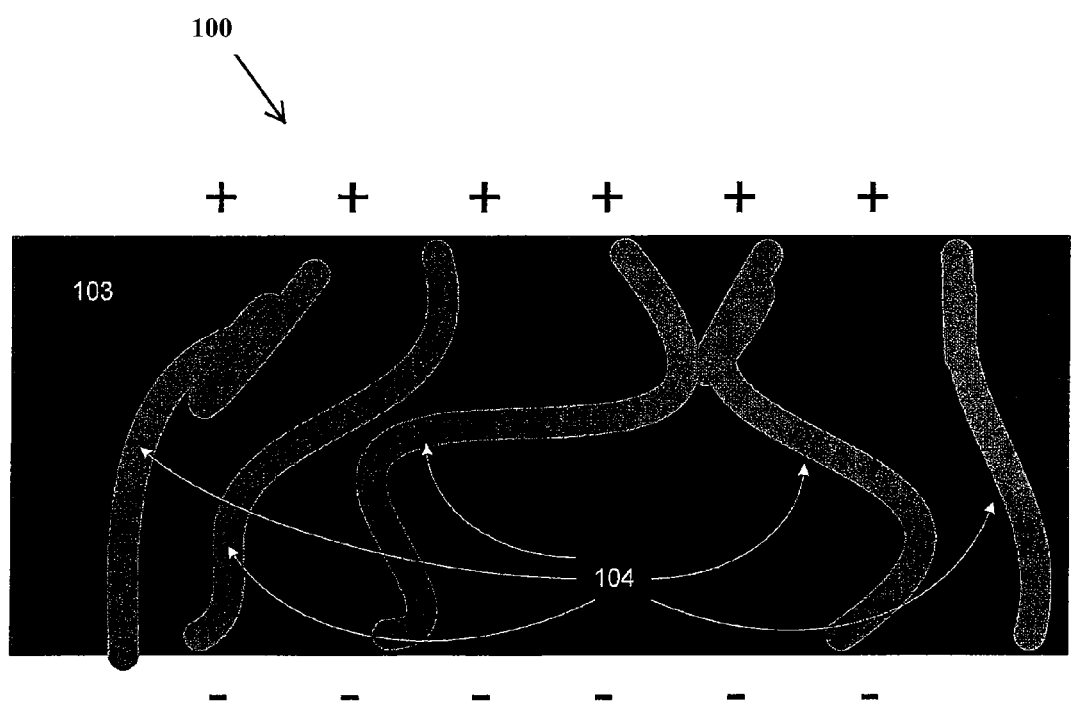
FIG. 1 is a simplified illustration of the concept of conductive channels in a structural matrix for enabling a solid polymer electrolyte that is ionically conductive, mechanically robust, and amenable to be manufactured by conventional polymer processing methods.

FIG. 1 is a simplified illustration of the concept of conductive channels in a structural matrix for enabling a solid polymer electrolyte 100 that is ionically conductive, mechanically robust, and amenable to be manufactured by conventional polymer processing methods. An exemplary electrolyte includes a structural region 103 and a conductive region 104. According to the embodiment, the structural region 103 and the conductive region 104 exist in solid phase at room temperature and are amenable to plastic and industrial processing. The conductive region 104 allows electrons and ions to be transported across the electrolyte 100 by mechanisms including bulk transport and conduction.

According to an embodiment, the conductive region 104 provides at least one pathway for ion conduction to flow through the electrolyte 100. FIG. 1 reveals one general concept, but a number of variations of domain morphology and nature of the pathways are possible. According to a specific embodiment, domains may be ordered in a variety of morphologies (e.g., lamellar or perforated lamellar), and their structure may include defects or locally non-continuous regions (e.g., at the interface between grains that are oriented differently). Moreover, as described below, the domains may have a variety of compositions and there may be additional domains interspersed within or at the interface between the conductive and structural domains.

Figure 2A:
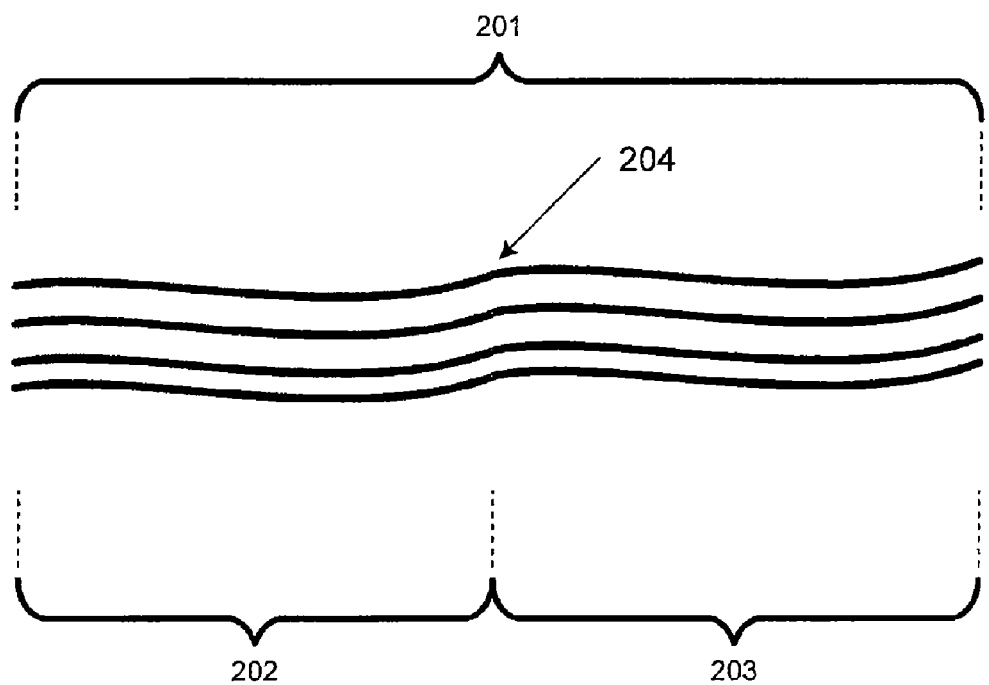
FIG. 2A is a simplified illustration of a plurality of linear diblock polymers made of two types of polymer blocks making up an exemplary solid polymeric electrolyte.

FIG. 2A is a simplified illustration of a plurality of linear diblock polymers made of two types of polymer blocks making up an exemplary solid polymeric electrolyte. According to an embodiment, a solid polymer electrolyte material comprises a plurality of linear diblock polymers 201, where each of the plurality of linear diblock polymers is made of two polymer blocks, each of the polymer blocks of a different type. As illustrated, according to the embodiment, the plurality of linear diblock polymers 201 comprises a plurality of first polymer blocks 202 and a plurality of second polymer blocks 203. The first and second polymer blocks are covalently bonded to each other at one end of each of the two polymer blocks. As illustrated, the first plurality of polymer blocks 202 and the second plurality of polymer blocks 203 are covalently bonded roughly along a region 204.

In general, a two-domain copolymer solid polymer electrolyte can be made of several materials. For example, according to the embodiment, a solid polymer electrolyte can be made of poly(styrene-block-ethylene oxide) (SEO) diblock copolymers containing a first domain made of polystyrene and a second domain made of polyethylene oxide. According to a specific embodiment, a SEQ diblock copolymer electrolyte with molecular weight of ~400,000 Daltons may be friable and breaks apart easily when attempts are made to form a free-standing thin film upon removal of solvent.

Figure 2B:
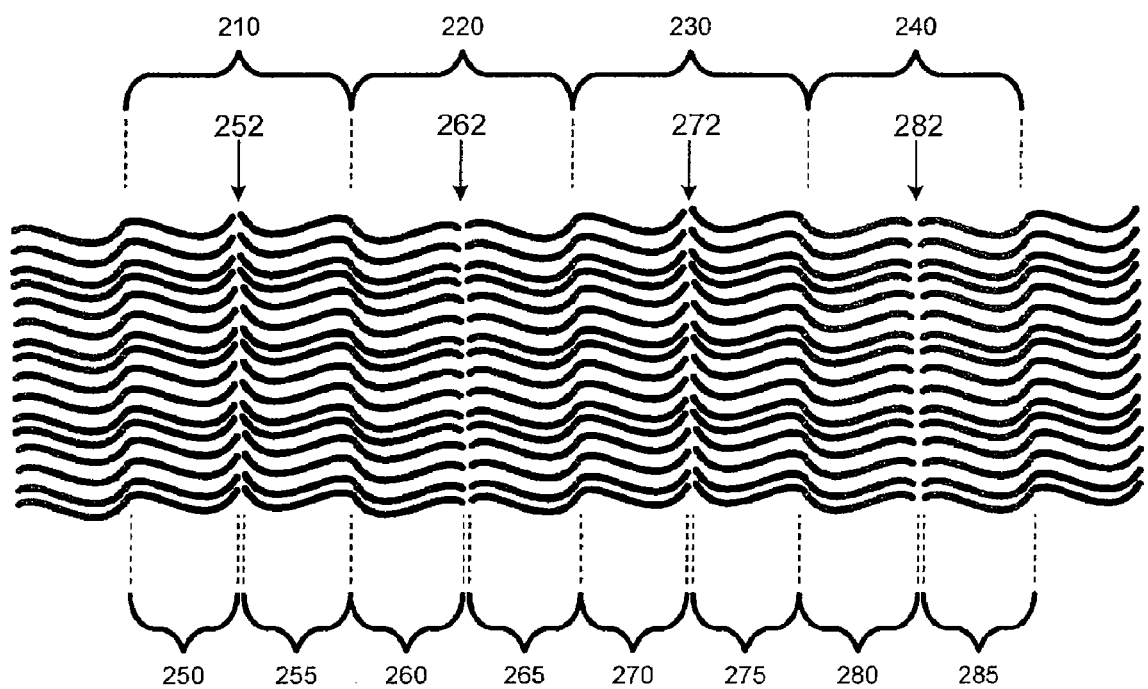
FIG. 2B is a simplified illustration of an exemplary two domain lamellar morphology that can arise from the molecular architecture of FIG. 2A.

FIG. 2B is a simplified illustration of an exemplary two domain lamellar morphology that can arise from the molecular architecture of FIG. 2A. According to an embodiment, a lamellar structure includes alternating layers of a first domain and a second domain. As illustrated, the first domain includes layers 210 and 230 and the second domain includes layers 220 and 240. According to the embodiment, the layers are arranged where layer 210 of the first domain resides adjacent to layer 220 of the second domain; layer 230 of the first domain resides adjacent to layer 220 of the second domain; and layer 240 of the second domain resides adjacent to layer 230 of the first domain.

According to an embodiment, the first domain is a conductive domain, where layers 210 and 230 constitute conductive polymers. According to the embodiment, the second domain is a structural domain, where layers 220 and 240 constitute structural polymers. According to another embodiment, the first domain is a structural domain, where layers 210 and 230 constitute structural polymers. According to the embodiment, the second domain is a conductive domain, where layers 220 and 240 constitute conductive polymers.

As is illustrated, in general, layer 210 of the first domain is made of polymer block 250 and polymer block 255 where polymer block 250 and polymer block 255 are not covalently bonded to each other. According to an embodiment, polymer block 250 and polymer block 255 may consequently slide relative to each other along a region 252. Similarly, as is also illustrated, layer 230 of the first domain is made of polymer block 270 and polymer block 275. According to an embodiment, polymer block 270 and polymer block 275 are also not covalently bonded to each other and may consequently also slide relative to each other along a region 272.

As is illustrated, in general, layer 220 of the second domain is made of polymer block 260 and polymer block 265. According to an embodiment, polymer block 260 and polymer block 265 are not covalently bonded to each other and may consequently slide relative to each other along a region 262. Similarly, as is also illustrated, layer 240 is made of polymer block 280 and polymer block 285. According to an embodiment, polymer block 280 and polymer block 285 are also not covalently bonded to each other and may consequently also slide relative to each other along a region 282.

Figure 2C:
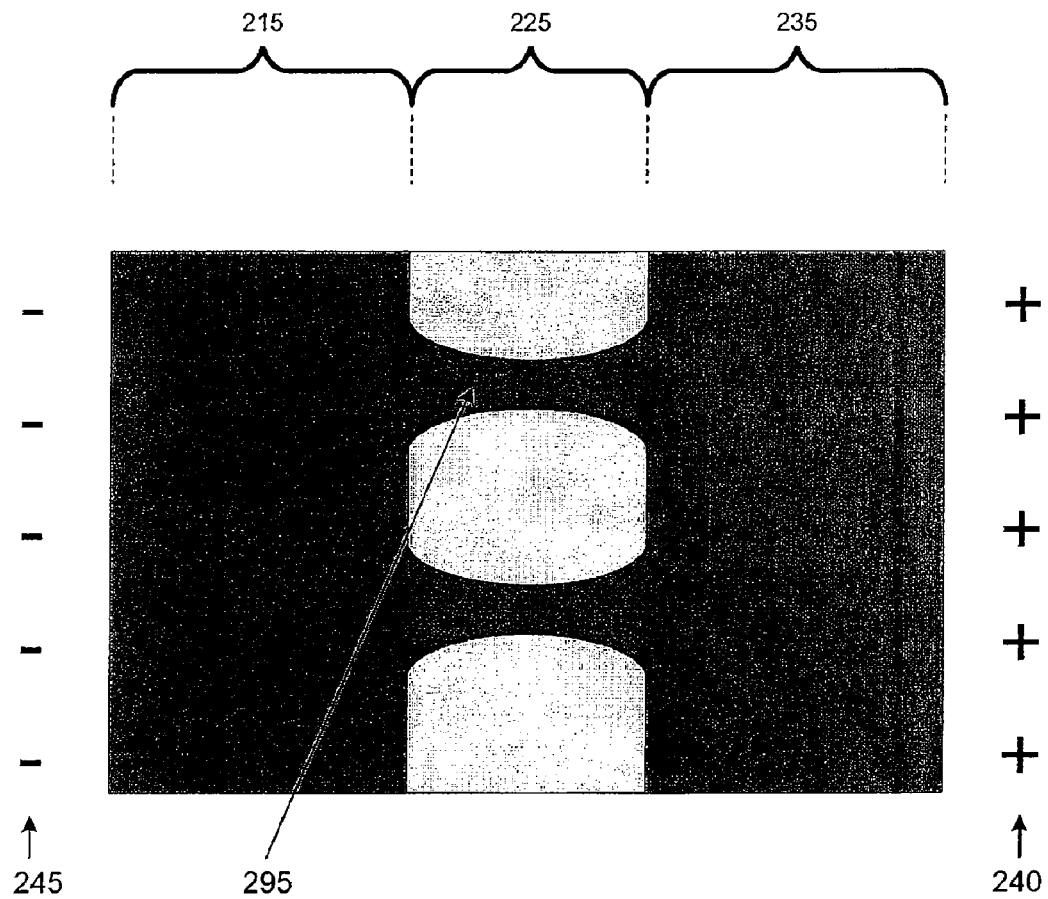
FIG. 2C is a simplified illustration of an exemplary two domain lamellar perforated morphology that can arise from the molecular architecture of FIG. 2A.

FIG. 2C is a simplified illustration of an exemplary two-domain perforated lamellar morphology that can arise from the molecular architecture of FIG. 2B. According to an embodiment, a perforated lamellar structure includes alternating layers of a first domain and a second domain. FIG. 2C shows a portion of such a perforated lamellar morphology including a layer 215 of a first domain adjacent a layer 225 of a second domain. The repeating structure includes a layer 235 of the first domain adjacent the layer 225 of the second domain. The morphology includes a plurality of extensions 295 of the first domains 215, 235 whereby the plurality of extensions 295 extend into perforations in the second domain 225. In one arrangement, the perforations (and also the extensions 295) have a height (vertical dimension as shown in FIG. 2C) of between about 5 and 100 nanometers.

According to an embodiment, a first domain extends into perforations into a second domain when the volume fraction of the first domain is larger than the volume fraction of the second domain. According to an embodiment, the first domain extending into the second domain is a conductive domain, and the second domain is a structural domain. According to the embodiment, the plurality of extensions 295 is adapted to conduct ions between one surface 240 of the electrolyte and another surface 245 of the electrolyte. According to another embodiment, the first domain extending into the second domain is a structural domain, and the second domain is a conductive domain.

Figure 3A:
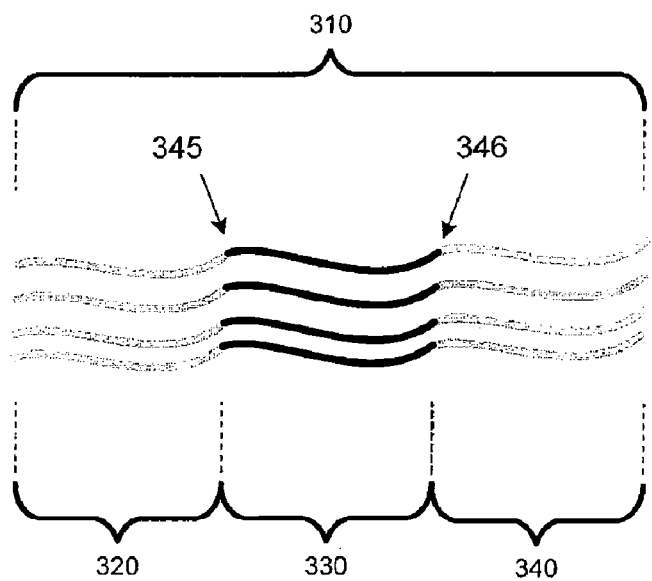
FIG. 3A is a simplified illustration of a linear triblock polymer made of two types of polymer blocks arranged in 1-2-1 configuration.

FIG. 3A is a simplified illustration of a linear triblock polymer made of two types of polymer blocks arranged in 1-2-1 configuration. An exemplary triblock 310 includes a first polymer block 320 of a first type, a polymer block 330 of a second type, and a second polymer block 340 of the first type. According to an embodiment, polymers of the first type form a conductive domain, and polymers of the second type form a structural domain. As illustrated, according to the embodiment, polymer block 330 is covalently bonded to polymer block 320 roughly along a region 345 and is also covalently bonded to polymer block 340 roughly along a region 346.

Figure 3B:
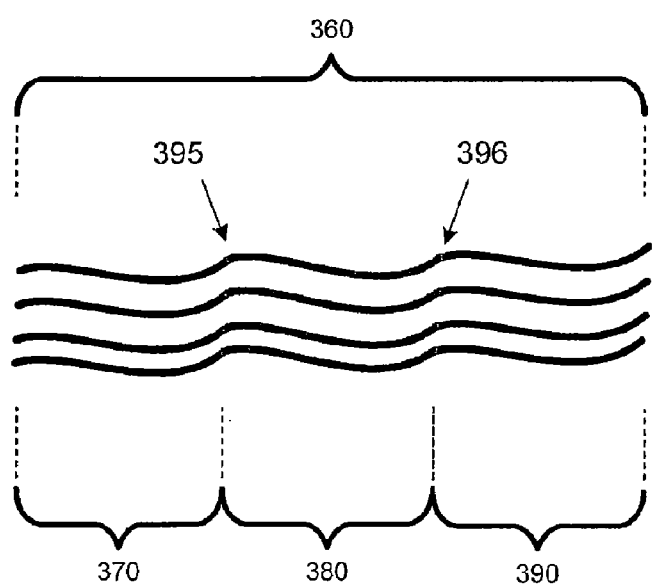
FIG. 3B is a simplified illustration of a linear triblock polymer made of two types of polymer blocks arranged in 2-1-2 configuration.

FIG. 3B is a simplified illustration of a linear triblock polymer made of two types of polymer blocks arranged in 2-1-2 configuration. An exemplary triblock 360 includes a first polymer block 370 of the second type, a polymer block 380 of the first type, and a second polymer block 390 of the second type. According to an embodiment, polymers of the first type form a conductive domain, and polymers of the second type form a structural domain. As illustrated, according to the embodiment, polymer block 380 is covalently bonded to polymer block 370 roughly along a region 395 and is also covalently bonded to polymer block 390 roughly along a region 396.

Figure 4A:
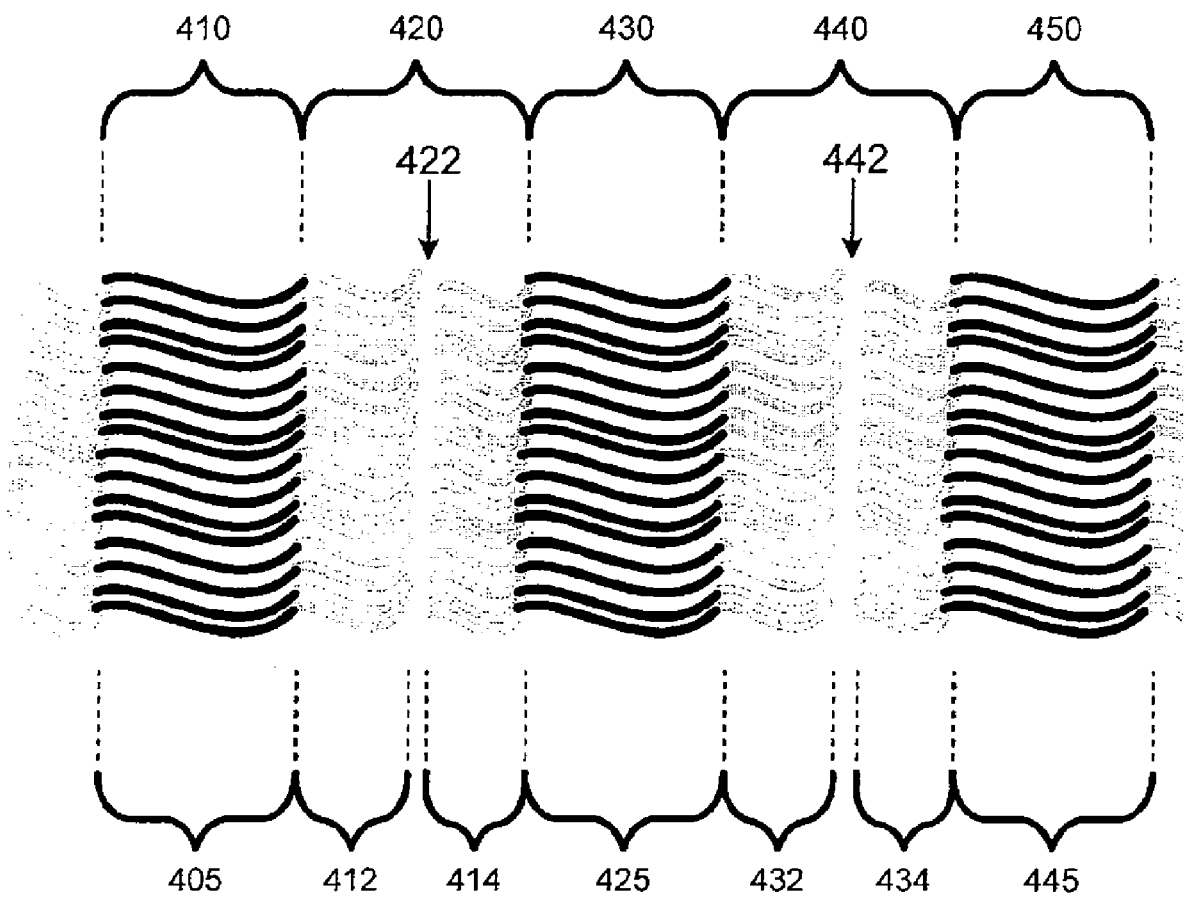
FIG. 4A is a simplified illustration of a two domain morphology of a solid polymer electrolyte arising from the 1-2-1 triblock molecular architecture illustrated in FIG. 3A.

FIG. 4A is a simplified illustration of a two domain morphology of a solid polymer electrolyte arising from the 1-2-1 triblock molecular architecture illustrated in FIG. 3A. According to an embodiment, an electrolyte comprises alternating layers of structural and conductive domains.

As illustrated in FIG. 4A, an exemplary material includes structural domains 410, 430, and 450 configured in alternating layers with conductive domains 420 and 440. According to the embodiment, the structural domain 410 is made of polymer block 405; the structural domain 430 is made of polymer block 425; and the structural domain 450 is made of polymer block 445. According to the embodiment, the conductive domain 420 is made of linear polymer block 412 and linear polymer block 414; and the conductive domain 440 is made of linear polymer block 432 and linear polymer block 434.

The linear polymer block 412 and the linear polymer block 414 of the conductive layer 420 are not covalently bonded to each other. The linear polymer block 412 and the linear polymer block 414 have free ends approximately along region 422, which can slide relative to one another or can entangle with one another. Similarly, the linear polymer block 432 and the linear polymer block 434 of the conductive layer 440 are not covalently bonded to each other and have free ends approximately along region 442, which can slide relative to one another or can entangle with one another. In contrast, the structural domains 410, 430, and 450 contain only single polymer blocks. In some arrangements, the additional entanglements in the conductive domains 420, 440 can toughen the electrolyte, making it easier to process than similar electrolytes made from diblock polymers.

Figure 4B:
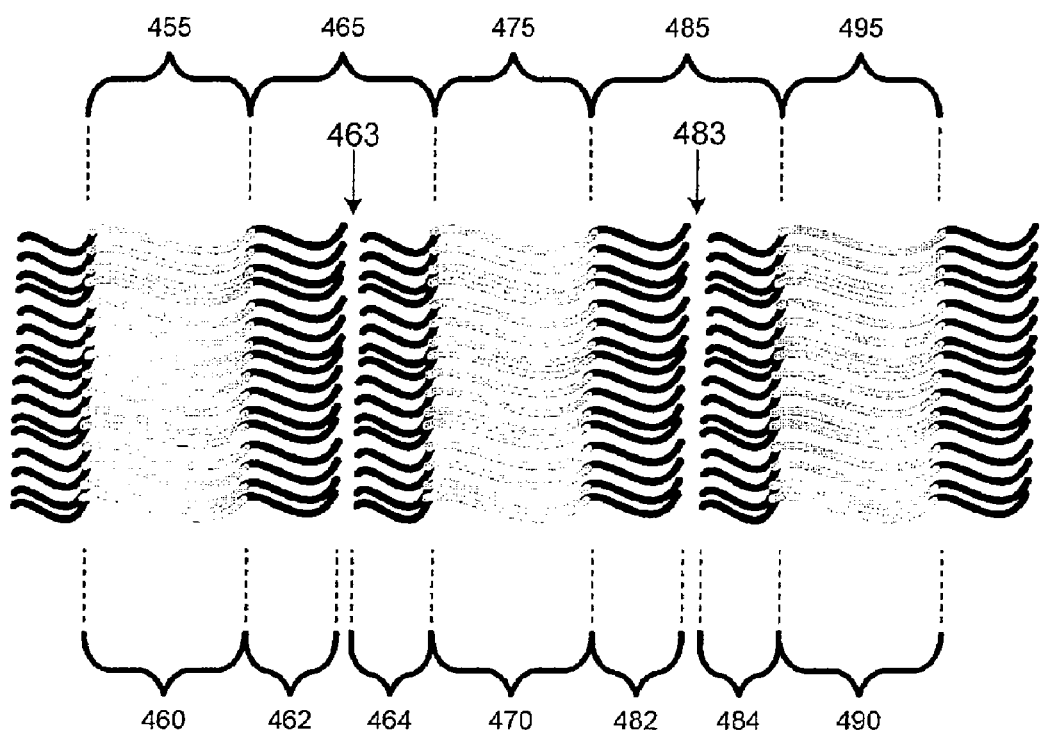
FIG. 4B is a simplified illustration of a two domain morphology of a solid polymer electrolyte arising from the 2-1-2 triblock molecular architecture illustrated in FIG. 3B.

FIG. 4B is a simplified illustration of a solid polymer electrolyte with a two domain morphology arising from the 2-1-2 triblock molecular architecture illustrated in FIG. 3B. According to an embodiment, an electrolyte comprises alternating layers of structural and conductive domains. A portion of this morphology is illustrated in FIG. 4B.

As illustrated in FIG. 4B, an exemplary material includes structural domains 465 and 485 configured in alternating layers with conductive domains 455, 475, and 495. According to the embodiment, the structural domain 465 is made of polymer block 462 and polymer block 464; the structural domain 485 is made of polymer block 482 and polymer block 484. According to the embodiment, the conductive domain 455 is made of linear polymer block 460; the conductive domain 475 is made of linear polymer block 470; and the conductive domain 495 is made of linear polymer block 490.

The polymer block 462 and the polymer block 464 of structural domain 465 are not covalently bonded to each other along region 463. Similarly, the polymer block 482 and the polymer block 484 of structural domain 485 are not covalently bonded to each other along region 483. In one arrangement, the structural domains 465, 485 are glassy polymers; they have similar mechanical properties whether or not there are covalent bonds in the regions 463, 483. Conductive domains 455, 475, and 495 contain only single linear polymer blocks 460, 470, 490, respectively. Each linear polymer block 470 is tethered at each end by the structural polymer blocks 464, 482. Similarly, each linear polymer block 460 is tethered at each end by the structural polymer blocks 462 and the unlabeled one at the left, and each linear polymer block 490 is tethered at each end by the structural polymer blocks 484 and the unlabeled one at the right. In one embodiment, this tethering of the conductive linear polymer blocks at both ends increases the toughness of the electrolyte, making it less brittle and friable, and easier to process than an electrolyte made from diblock-based block copolymers described previously.

Figure 4C:
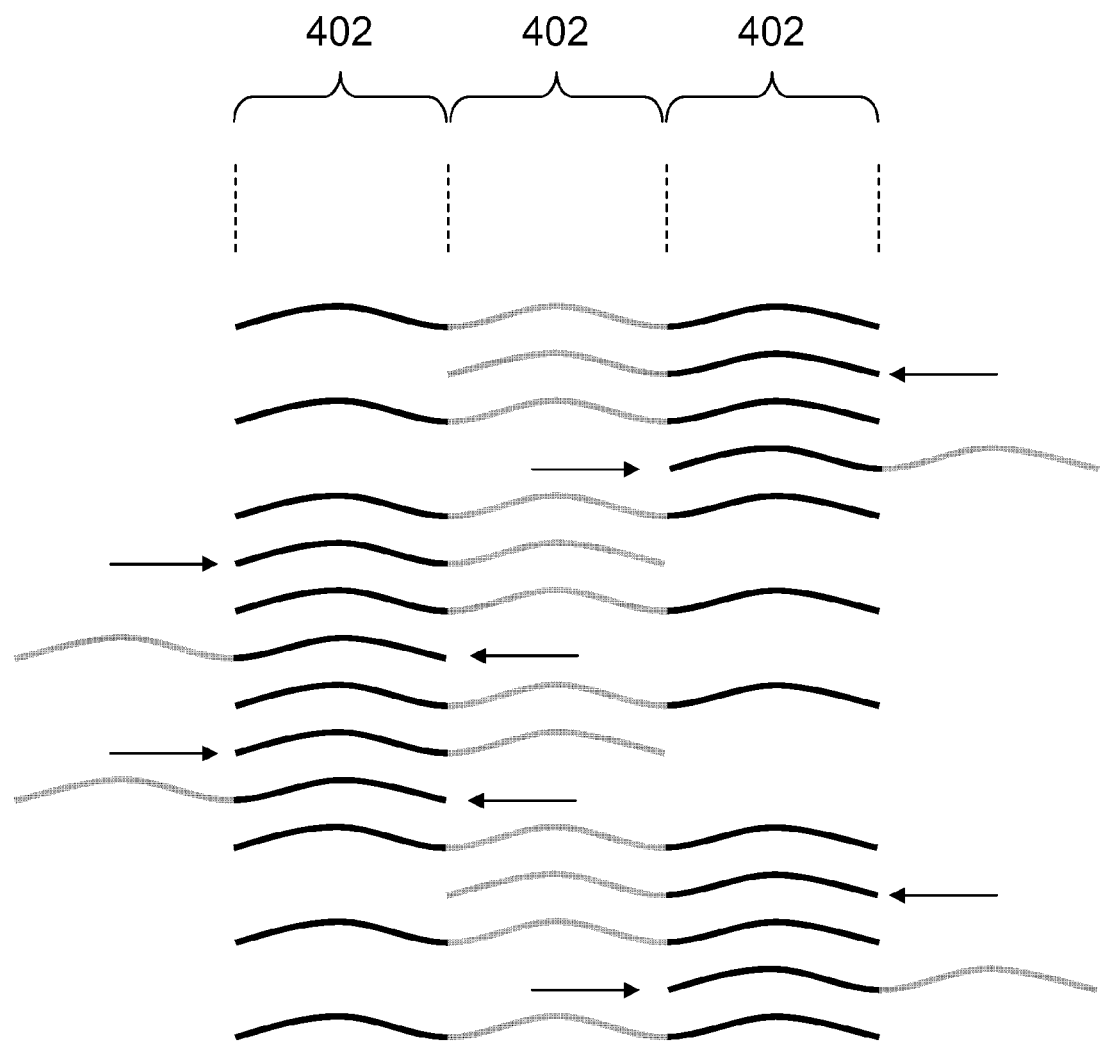
FIG. 4C is a simplified illustration of a two domain morphology of a solid polymer electrolyte arising from a mixed diblock and 2-1-2 triblock molecular architecture, according to an embodiment of the invention.

FIG. 4C is a simplified illustration of a solid polymer electrolyte with a two domain morphology arising from a mixed diblock and 2-1-2 triblock molecular architecture, according to an exemplary embodiment of the invention. In the example, the electrolyte has structural domains 402, 406 and a conductive domain 404. Some of the polymers that make up the domain structure are triblocks of the 2-1-2 kind. Other polymers, as indicated by the arrows are diblock copolymers. In any of the embodiments of the invention, as disclosed herein, the domain structures can be made by an analogous mixture of diblocks and triblocks as shown in FIG. 4C.

The solid polymer electrolytes described in FIG. 4A, FIG. 4B, and FIG. 4C can be made of any of several materials. In one exemplary embodiment, a two-domain solid polymer electrolyte is made of poly(styrene-block-ethylene oxide-block-styrene) (SEOS) triblock copolymers. In another exemplary embodiment, two-domain solid polymer electrolyte is made of a mixture of SEOS triblock copolymers and poly(styrene-block-ethylene oxide) (SEO) diblock copolymers. In one embodiment, the first domain is made of polystyrene and the second domain is made of polyethylene oxide. In one embodiment, the SEOS triblock copolymer electrolyte has a molecular weight of about 400,000 Daltons, is not friable, and does not easily break apart on attempts to form the polymer into desirable shapes.

Figure 5:
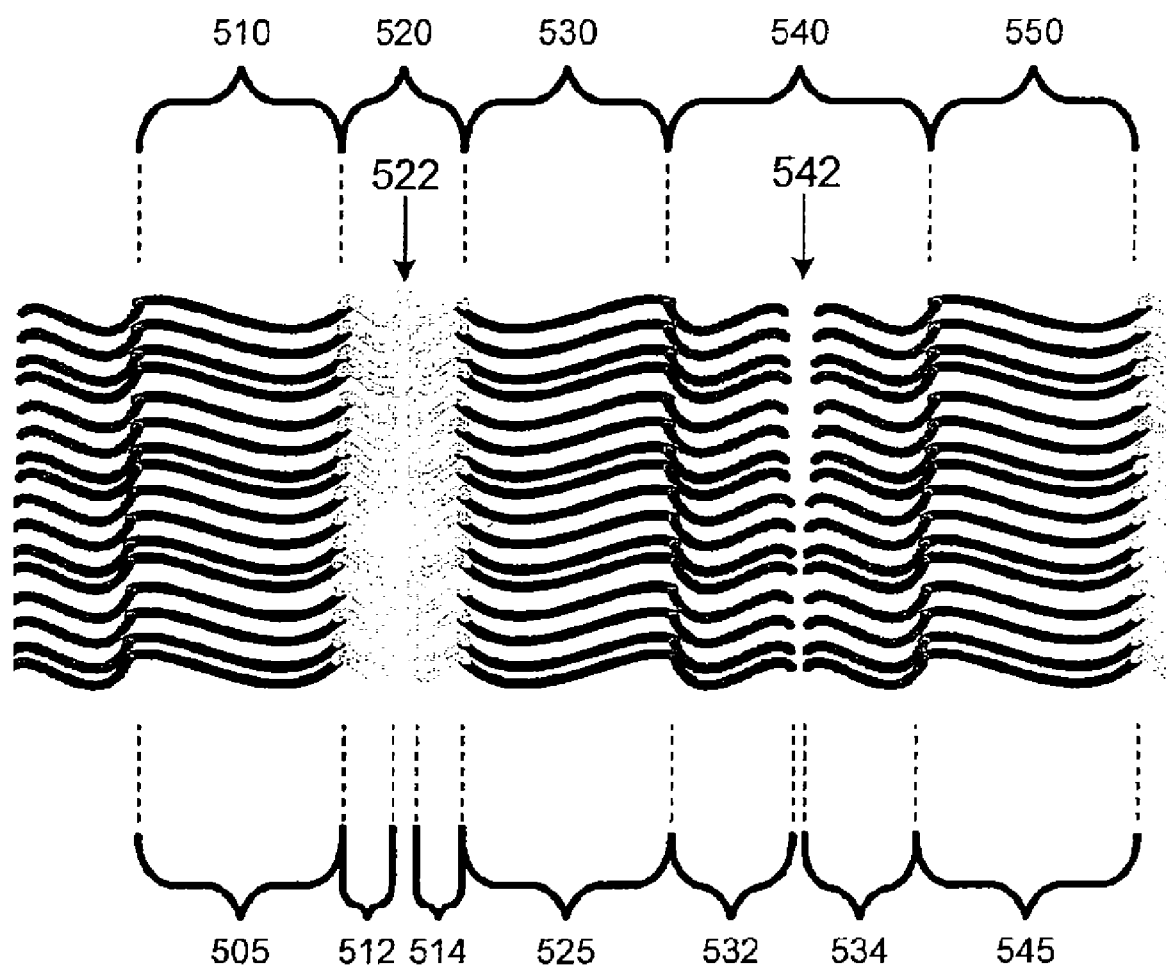
FIGS. 5-7 are simplified illustrations of a three domain morphology of a solid polymer electrolyte arising from a triblock molecular architecture according to an aspect of the current invention.
Figure 6:
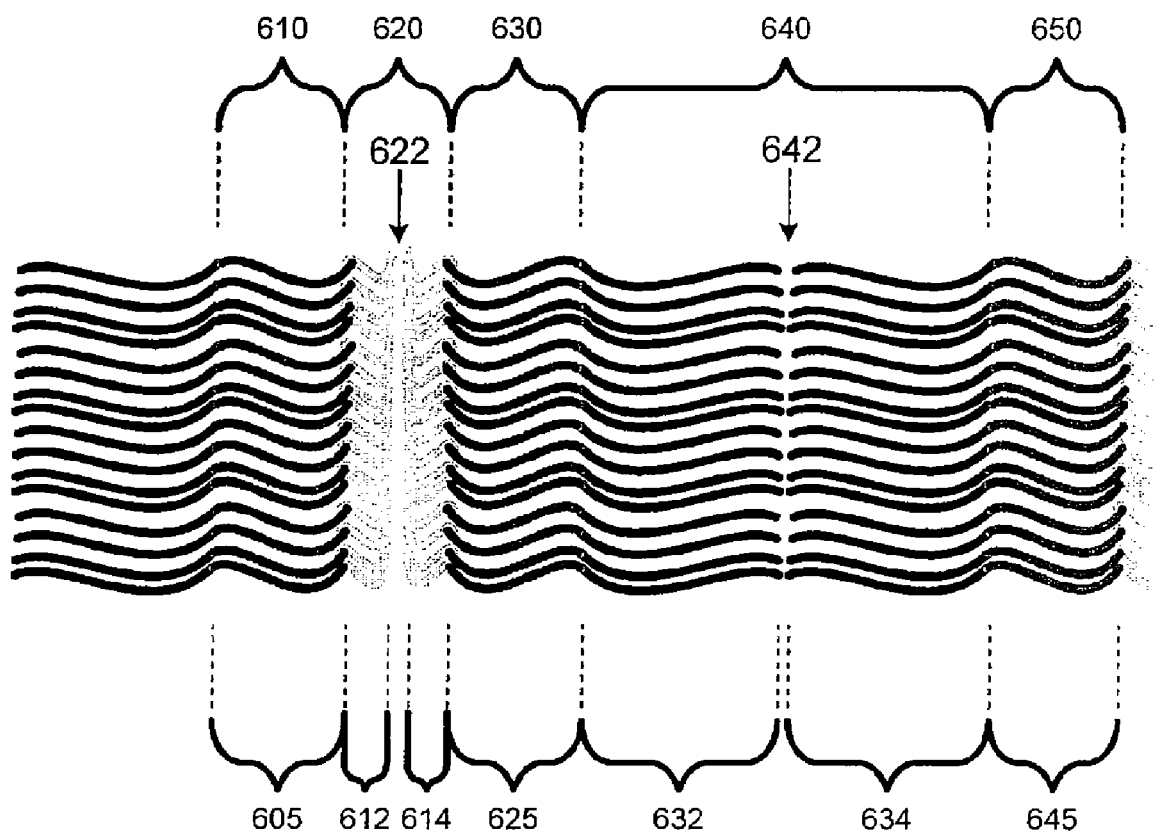
Figure 7:
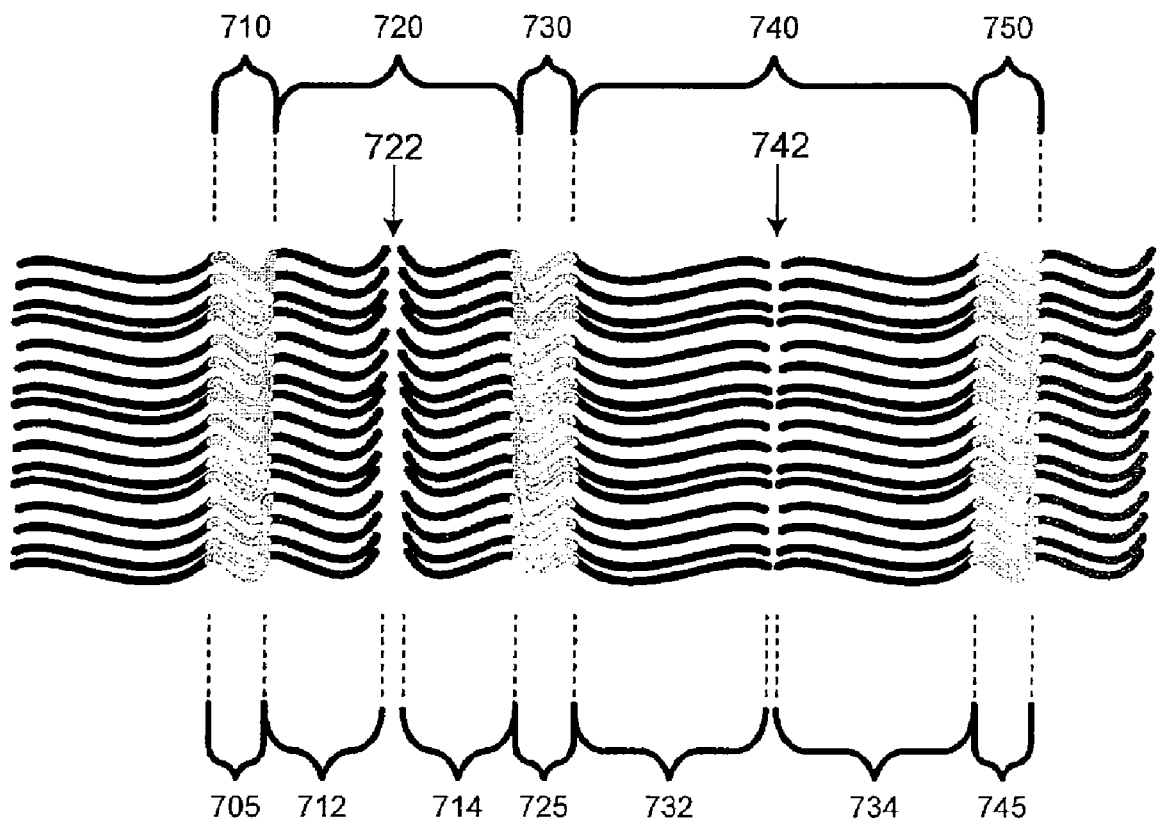

FIGS. 5-7 are simplified illustrations of a solid polymer electrolyte with a three domain morphology arising from a triblock molecular architecture according to an aspect of the current invention. According to an embodiment, an exemplary triblock electrolyte comprises a structural domain, a conductive domain, and a third domain. A portion of this morphology is illustrated in FIGS. 5-7. According to an embodiment, a three-domain morphology may enable a solid electrolyte material that is ionically more conductive, mechanically more robust, and more manufacturable by conventional polymer processing methods than the diblock-based block copolymers described above. In some embodiments of the invention, the third domain is a polymer, such as a rubbery polymer, that can increase the toughness of the polymer electrolyte, making it less brittle, without sacrificing strength. In one embodiment, the polymer in the third domain is cross-linked.

FIG. 5 is a simplified illustration of a solid polymer electrolyte with a three domain morphology arising from a 2-1-3 triblock molecular architecture. As illustrated in the figure, an exemplary material includes conductive domains 510, 530, and 550, a structural domain 540, and a third domain 520. According to the embodiment, the conductive domain 510 is made of linear polymer block 505; the conductive domain 530 is made of linear polymer block 525; and the conductive domain 550 is made of linear polymer block 545; the third domain 520 is made of polymer block 512 and polymer block 514; the structural domain 540 is made of polymer block 532 and polymer block 534.

FIG. 6 is a simplified illustration of a solid polymer electrolyte with a three domain morphology arising from a 1-2-3 triblock molecular architecture. As illustrated in the figure, an exemplary material includes a conductive domain 640, structural domains 610, 630, and 650, and a third domain 620. According to the embodiment, the conductive domain 640 is made of polymer blocks 632 and 634; the structural domains 610, 630, and 650 are made of polymer block 605, 625, and 645, respectively; and the third domain 620 is made of polymer blocks 612 and 614.

FIG. 7 is a simplified illustration of a solid polymer electrolyte with a three domain morphology of arising from a 1-3-2 triblock molecular architecture. As illustrated in the figure, an exemplary material includes a conductive domain 740, a structural domain 720, and third domains 710, 730, and 750. According to the embodiment, the conductive domain 740 is made of polymer blocks 732 and 734; the third domains 710, 730, and 750 are made of polymer block 705, 725, and 745, respectively; and the structural domain 720 is made of polymer blocks 712 and 714.

In one embodiment of the invention, the third domain has a volume between about 2% and 20% of the sum of the volumes of the first domain and the second domain. In one embodiment of the invention, the third domain has a volume between about 2% and 10% of the sum of the volumes of the first domain and the second domain. In one embodiment of the invention, the third domain has a volume between about 2% and 5% of the sum of the volumes of the first domain and the second domain.

Figure 8A:
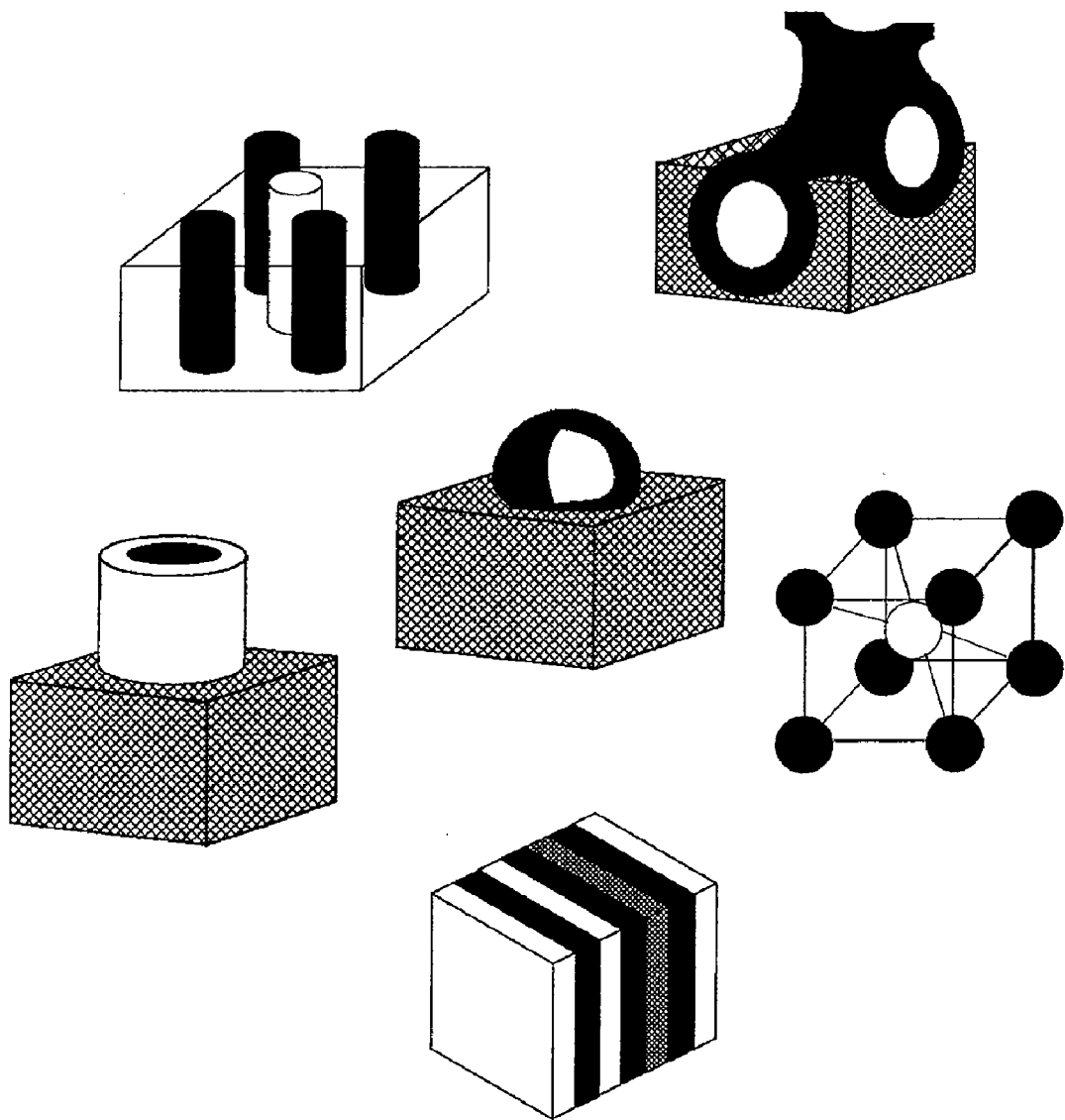
FIGS. 8A-8C are simplified illustrations of a few of the morphological features of a solid electrolyte material formed from a three domain morphology, triblock architecture electrolyte as contemplated under the current invention.
Figure 8B:
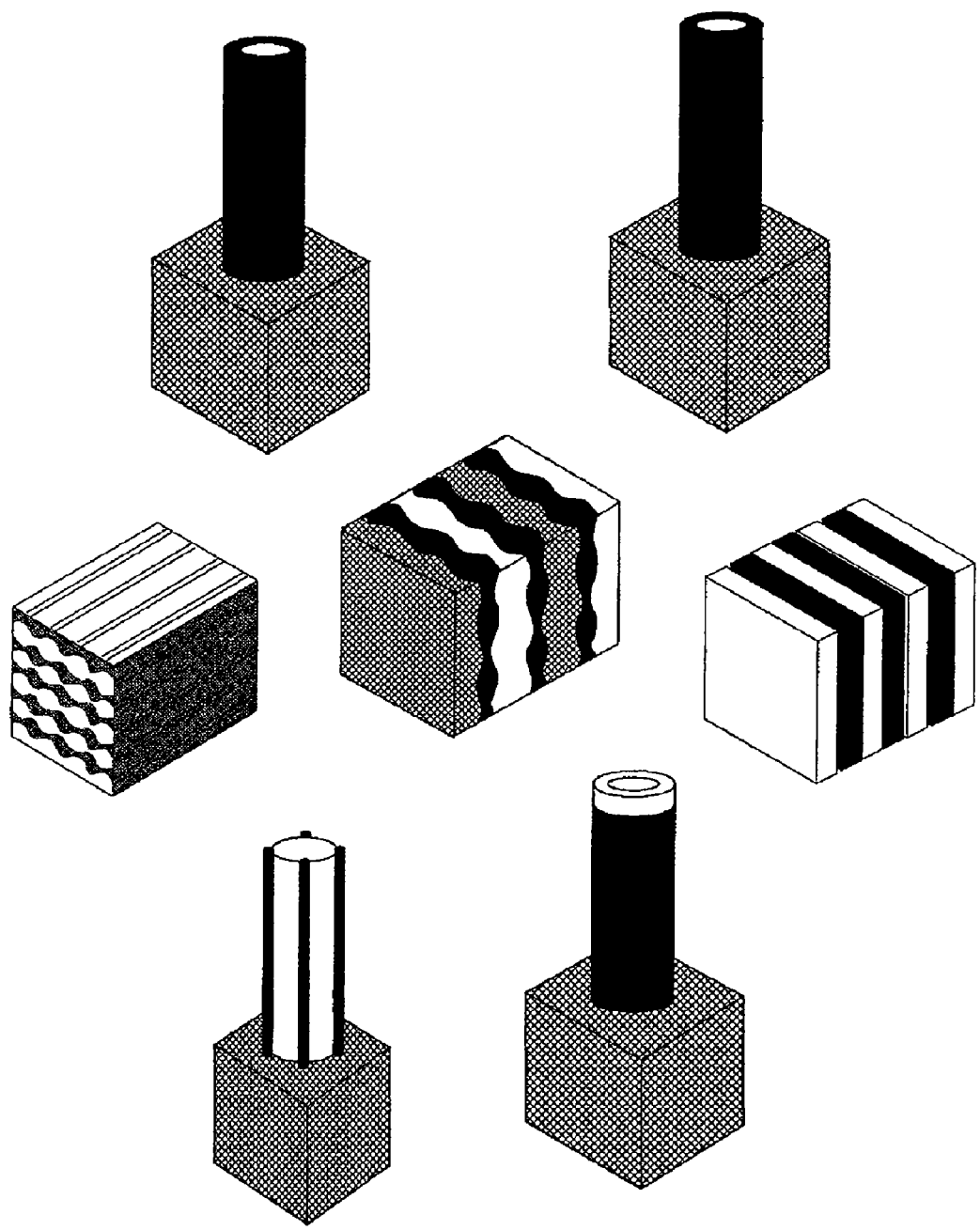
Figure 8C:
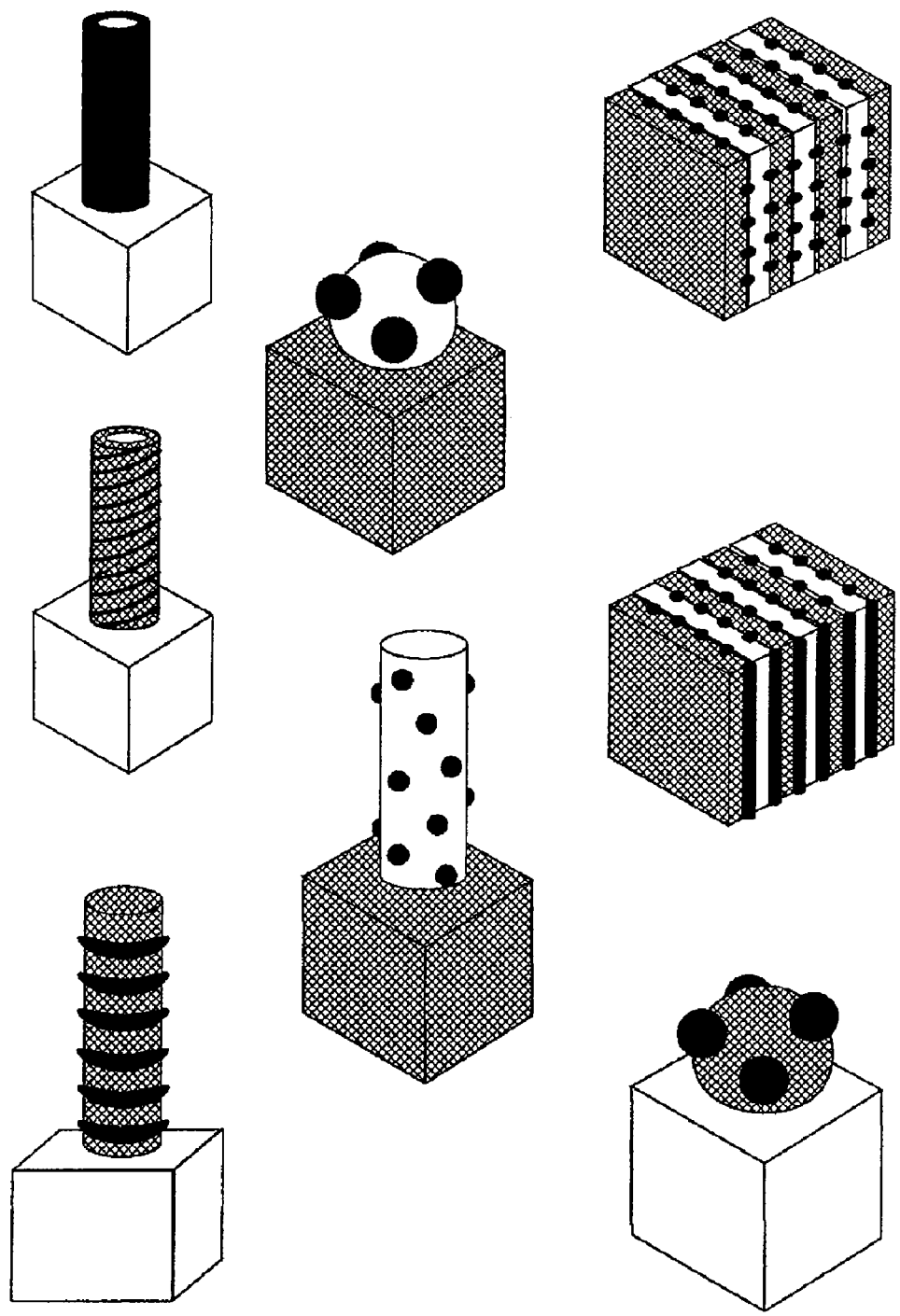

FIGS. 8A-8C are simplified illustrations of a few of the morphological features of a solid electrolyte material formed from a three domain morphology, triblock architecture electrolyte as contemplated under the current invention. According to an embodiment, the morphology includes two primary domains as indicated by the grey domains and the white domains in the figures. The morphology further includes a third domain as indicated by black domains in the figures.

According to the embodiment, one of the primary domains (either the grey domain or the white domain) is a structural domain and the other one of the primary domains is a conductive domain. The third domain need not be conductive or structural but should either form a contiguous region or form a plurality of regions of material different from that of the primary domains between the conductive domain and the structural domain, according to an embodiment.

Choosing appropriate polymers for the structures described herein is important in order to achieve the desired properties. In one embodiment, the conductive linear polymer (1) exhibits ionic conductivity of at least $10^{-5}$ Scm$^{-1}$ at electrochemical cell operating temperatures when combined with an appropriate salt(s), such as lithium salt(s); (2) is chemically stable against such salt(s); and (3) is thermally stable at electrochemical cell operating temperatures. In one embodiment, the structural material has a modulus in excess of $1 \times 10^7$ Pa at electrochemical cell operating temperatures. In one embodiment, the third material (1) is rubbery; and (2) has a glass transition temperature lower than operating and processing temperatures. In order to form the desired morphologies, all materials are mutually immiscible.

In general, conductive polymers have greater conductivity when they are not in glassy or crystalline forms. In one embodiment of the invention, the polymer that makes up the conductive domain of the polymer electrolyte is somewhat crystalline at 25 degrees C. As discussed above, the perforated lamellar structure can be useful in reducing crystallinity. In one arrangement, the crystalline phase makes up no more than 10% of the conductive domain. In one arrangement, the determination of crystal content can be measured by differential scanning calorimetry.

In one embodiment of the invention, the conductive linear block polymer has a molecular weight greater than 50,000 Daltons. In another embodiment of the invention, the conductive linear block polymer has a molecular weight greater than 100,000 Daltons. In one embodiment of the invention, the structural block polymer has a molecular weight greater than 50,000 Daltons. In another embodiment of the invention, the structural block polymer has a molecular weight greater than 100,000 Daltons. In one embodiment of the invention, the linear diblock copolymer that makes up the domains of the electrolyte has a molecular weight greater than 150,000 Daltons. In another embodiment of the invention, the linear diblock copolymer that makes up the domains of the electrolyte has a molecular weight greater than 350,000 Daltons. In one embodiment of the invention, the linear triblock copolymer that makes up the domains of the electrolyte has a molecular weight greater than 250,000 Daltons. In another embodiment of the invention, the linear triblock copolymer that makes up the domains of the electrolyte has a molecular weight greater than 400,000 Daltons.

Figure 9A:
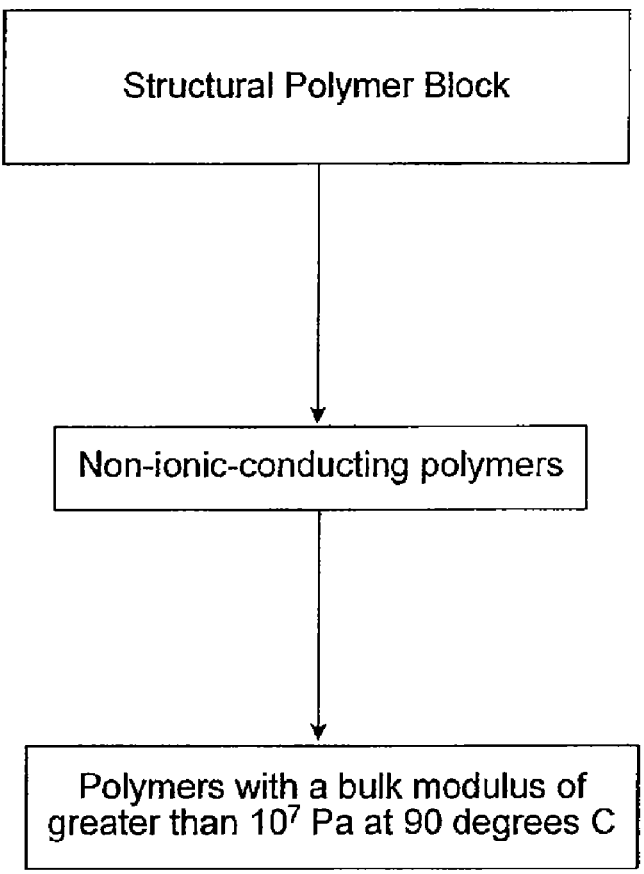
FIGS. 9A-9I are simplified illustrations showing some of the types of materials from which the various types of domains as contemplated under the current invention can be formed.

FIG. 9A is a simplified illustration showing some of the types of materials from which a structural domain can be formed. According to an embodiment, the structural domain is made of polymer blocks including non-ionic-conducting polymers characterized by a bulk modulus of greater than $10^7$ Pa at 90 degrees C.

Figure 9B:
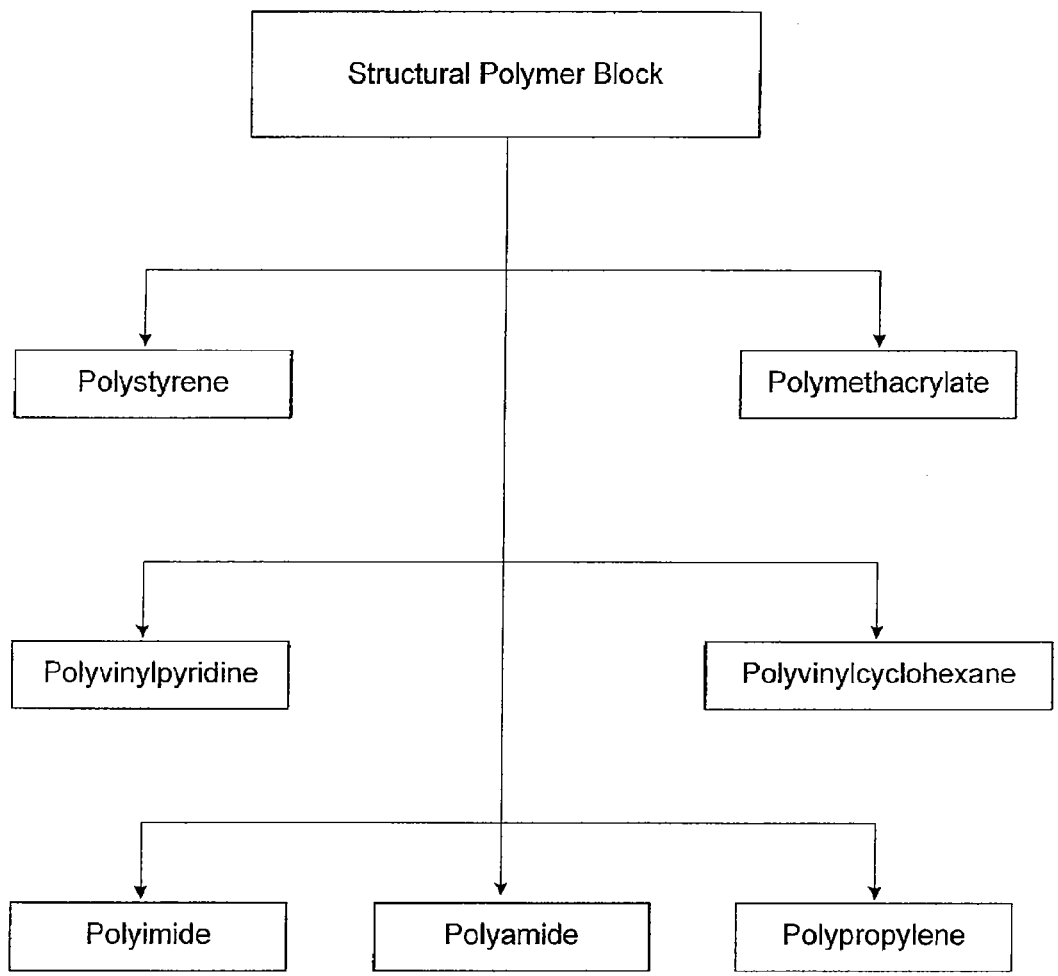

FIG. 9B is a simplified illustration showing some other materials from which a structural domain can be formed. According to another embodiment, the structural domain is made of polymers such as polystyrene, polymethacrylate, polyvinylpyridine, polyvinylcyclohexane, polyimide, polyamide, and/or polypropylene. In one embodiment, the structural domain is polystyrene. In one embodiment, the structural domain is polymethacrylate. In one embodiment, the structural domain is polyvinylpyridine. In one embodiment, the structural domain is polyvinylcyclohexane. In one embodiment, the structural domain is polyimide. In one embodiment, the structural domain is polyamide. In one embodiment, the structural domain is polypropylene.

Figure 9C:
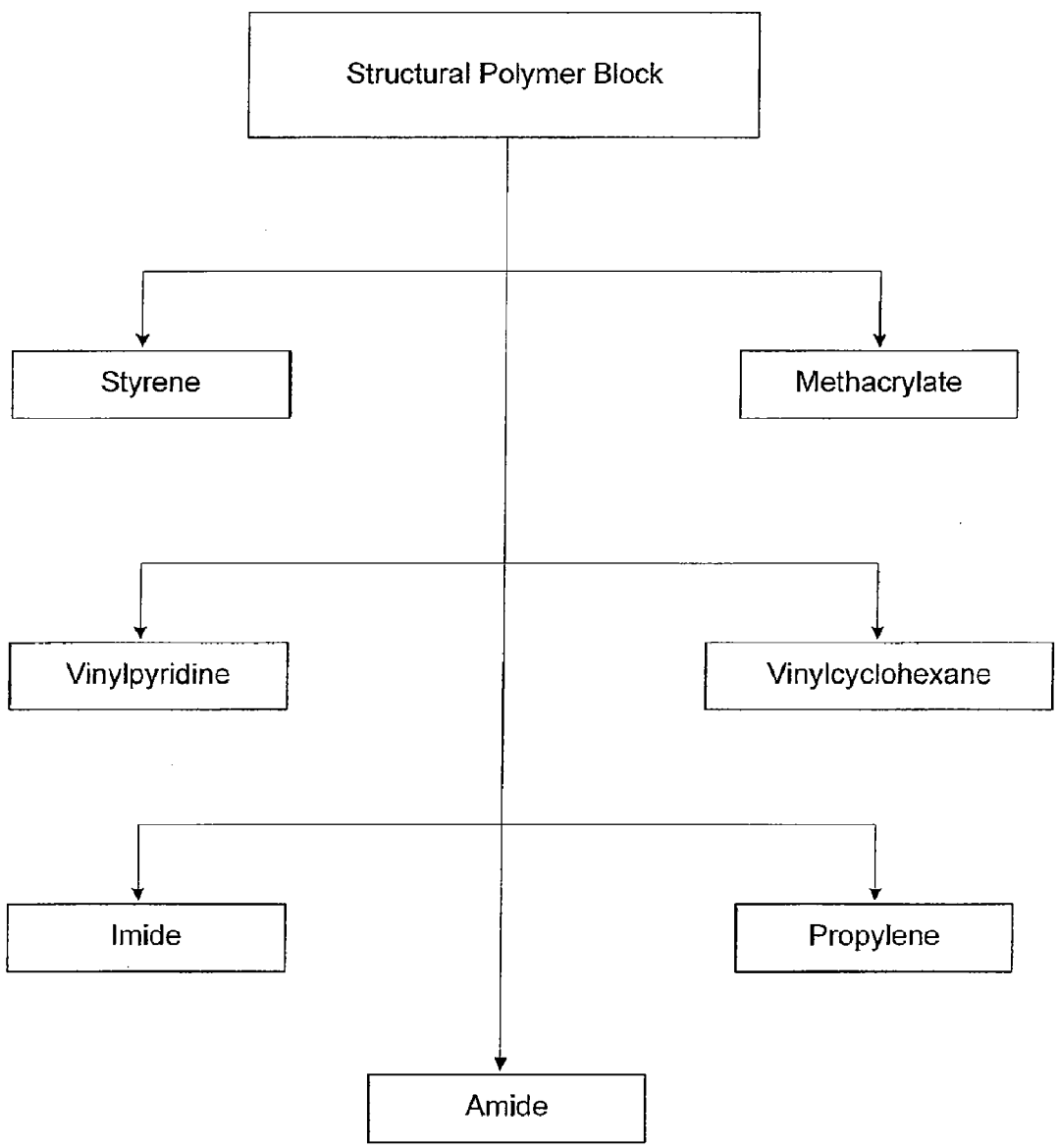

FIG. 9C is a simplified illustration showing some other materials from which a structural domain can be formed. According to another embodiment, the structural domain is made of copolymers that contain styrene, methacrylate, vinylpyridine, vinylcyclohexane, imide, propylene, and/or amide.

Figure 9D:
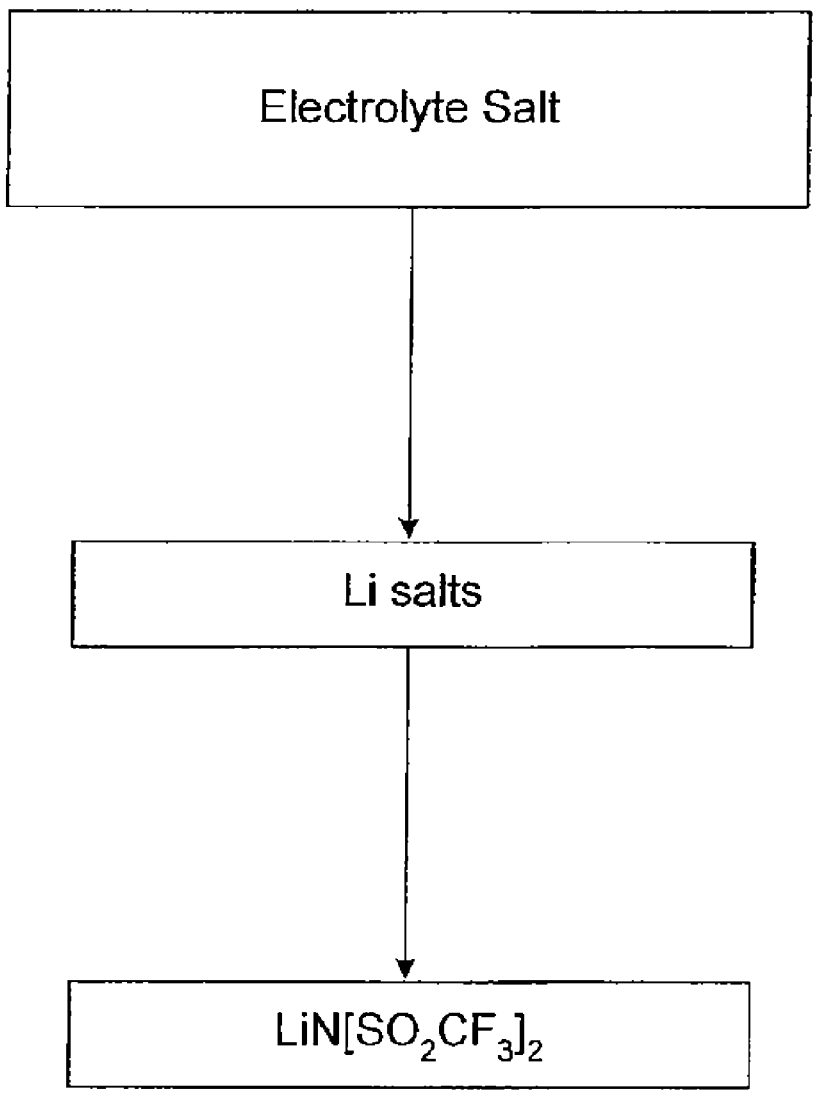

FIG. 9D is a simplified illustration showing salts that can be used in the conductive domain. Examples of appropriate salts include, but are not limited to metal salts selected from the group consisting of chlorides, bromides, sulfates, nitrates, sulfides, hydrides, nitrides, phosphides, sulfonamides, triflates, thiocynates, perchlorates, borates, or selenides of lithium, sodium, potassium, silver, barium, lead, calcium, ruthenium, tantalum, rhodium, iridium, cobalt, nickel, molybdenum, tungsten or vanadium. Examples of specific lithium salts include LiSCN, LiN(CN)$_2$, LiClO$_4$, LiBF$_4$, LiAsF$_6$, LiPF$_6$, LiCF$_3$SO$_3$, Li(CF$_3$SO$_2$)$_2$N, Li(CF$_3$SO$_2$)$_3$C, LiN(SO$_2$C$_2$F$_5$)$_2$, LiN(SO$_2$CF$_3$)$_2$, LiN(SO$_2$CF$_2$CF$_3$)$_2$, lithium alkyl fluorophosphates, lithium oxalatoborate, as well as other lithium bis(chelato)borates having five to seven membered rings, lithium bis(trifluoromethane sulfone imide) (LiTFSI), LiPF$_3$(C$_2$F$_5$)$_3$, LiPF$_3$(CF$_3$)$_3$, LiB(C$_2$O$_4$)$_2$, and mixtures thereof. In other embodiments of the invention, for other electrochemistries, electrolytes are made by combining the polymers with various kinds of salts. Examples include, but are not limited to AgSO$_3$CF$_3$, NaSCN, NaSO$_3$CF$_3$, KTFSI, NaTFSI, Ba(TFSI)$_2$, Pb(TFSI)$_2$, and Ca(TFSI)$_2$.

Figure 9E:
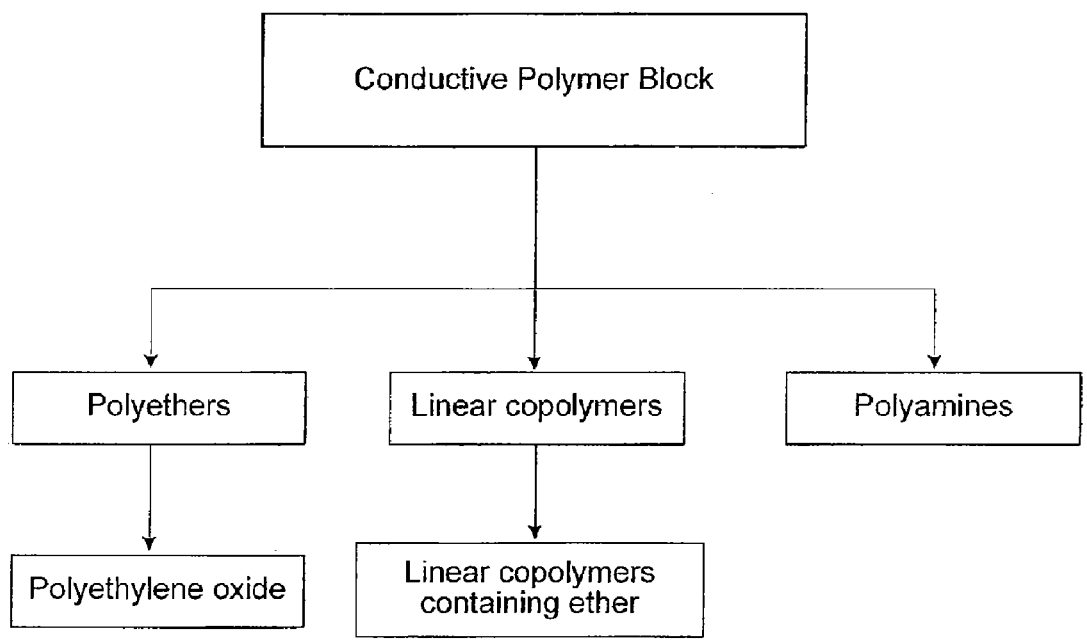

FIG. 9E is a simplified illustration showing some of the types of materials from which a conductive domain can be formed. According to one embodiment, the conductive domain is a linear polymer. The conductive linear polymer can be an ether. The conductive linear polymer can be a polyether. The conductive linear polymer can be a polyamine. The conductive linear polymer can be polyethylene oxide. The conductive linear polymer can be ethylene carbonate.

Figure 9F:
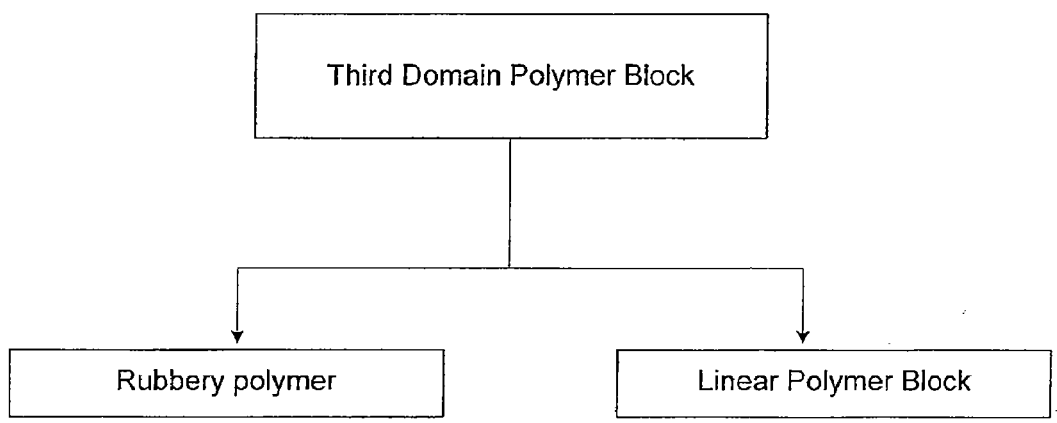

FIG. 9F is a simplified illustration showing some of the types of materials from which a third domain can be formed. According to an embodiment, the third domain is made of any of several types of rubbery polymers. According to another embodiment, the third domain is made of any of several types of linear polymer blocks.

Figure 9G:
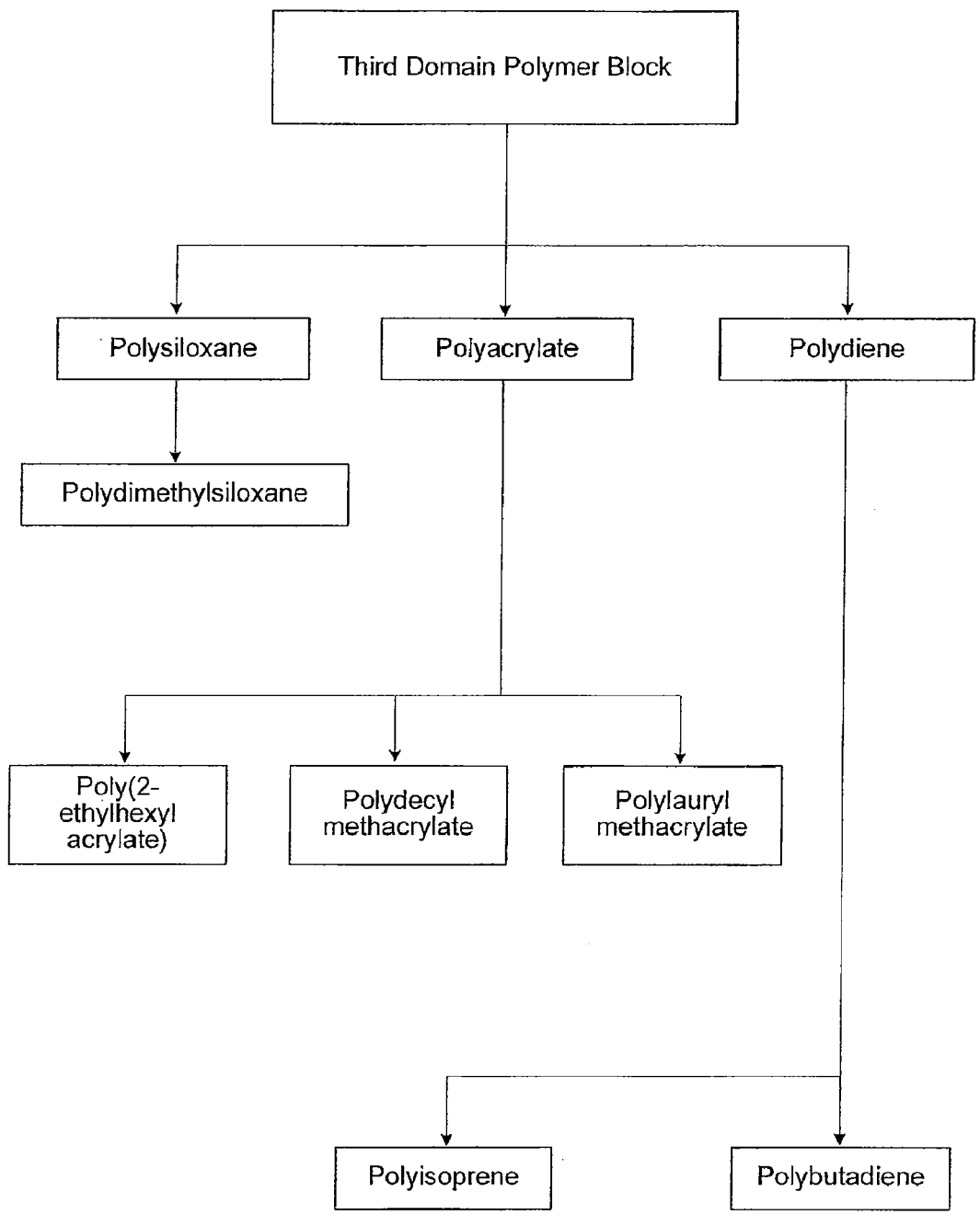

FIG. 9G is a simplified illustration showing some of the types of materials from which a third domain can be formed. According to an embodiment, the third domain can made of rubbery materials such as polysiloxanes, polyacrylates, and/or polydienes. An exemplary polysiloxane is polydimethylsiloxane. Exemplary polyacrylates include poly(2-ethylhexyl acrylate), polydecyl methacrylate or polylauryl methacrylate. Exemplary polydienes include polyisoprene or polybutadiene.

According to an embodiment, the solid polymer electrolyte materials described here may be improved if one or more additives (or species) that enhance(s) ionic conductivity is included in the ionically conductive domain. The additive can improve ionic conductivity in the conductive domain by lowering the degree of crystallinity, melting temperature, and glass transition temperature, and further by increasing chain mobility. The ionic conductivity improvement can be as much as an order of magnitude or more. Moreover, a high dielectric additive can aid dissociation of the salt, increasing the number of Li+ ions available for ion transport, and reducing the bulky Li+ [salt] complexes. Finally, additives that can weaken the interaction between Li+ and PEO chains/anion, thereby making it easier for Li+ ions to diffuse, may be included in the conductive domain. The kinds of additives that enhance ionic conductivity can be described by the following:

(a) Low molecular weight conductive polymers: Low molecular weight ionically conductive polymers such as polyethers and polyamines may act as plasticizers and increase chain mobility in the conductive domain. These low-molecular weight polymers may also increase ionic conductivity via a vehicular Li+ transport. As an example, the addition of low MW PEO oligomers (MW~0.5 kg/mol) results in PEO conductivity of $10^{-4}$ S/cm. Methoxy capped oligomers (PEGDME, PEGMME) tend to stabilize the Li-PEO interface;

(b) Ceramic particles: Ceramic particles may enhance ionic conductivity by disrupting the coordination between PEO chains and Li+. The sequestration of the anion (e.g., TFSI) by the hydroxyl groups results in an increase in the Li+ transference. Examples of ceramic particles include $Al_2O_3$, $TiO_2$, and $SiO_2$ nanoparticles. In some arrangements, the nanoparticles have no dimension larger than 10 nm. In other arrangements, the nanoparticles have no dimension larger than 5 nm;

(c) Room temp ionic liquids (RTILs): The relatively large anions of RTILs also disrupt the coordination between PEO chains and Li+. PEO-LiTFSI-RTIL ternary mixtures can yield room temperature conductivities of $10^{-4}$ S/cm. Examples of RTILs include N-butyl-N-methylpyrrolidinium bis(trifluoromethanesulfonyl)imide [PYR14+TFSI−], 1-butyl-3-methylimidazolium bis(trifluoromethanesulfonyl)imide [BMITFSI];

(d) High dielectric organic plasticizers: The organic species both plasticize PEO and increase the dissociation of Li salts. Li+ diffusion, and solvated Li+ transport provide parallel conducting pathways. Examples of plasticizers include ethylene carbonate and propylene carbonate.

e) Lewis acids: The addition of Lewis acids helps Li salt dissociation, as the anion coordinates with the Lewis acid. Examples of Lewis acids include PEG borate ester and PEG-aluminate ester.

In some arrangements, additives that enhance ionic conductivity are predominantly or exclusively in the conductive domain. Thus, the additives have little or no effect on the structural domain, so the mechanical properties of block copolymer electrolytes are unchanged by the use of additives.

Figure 9H:
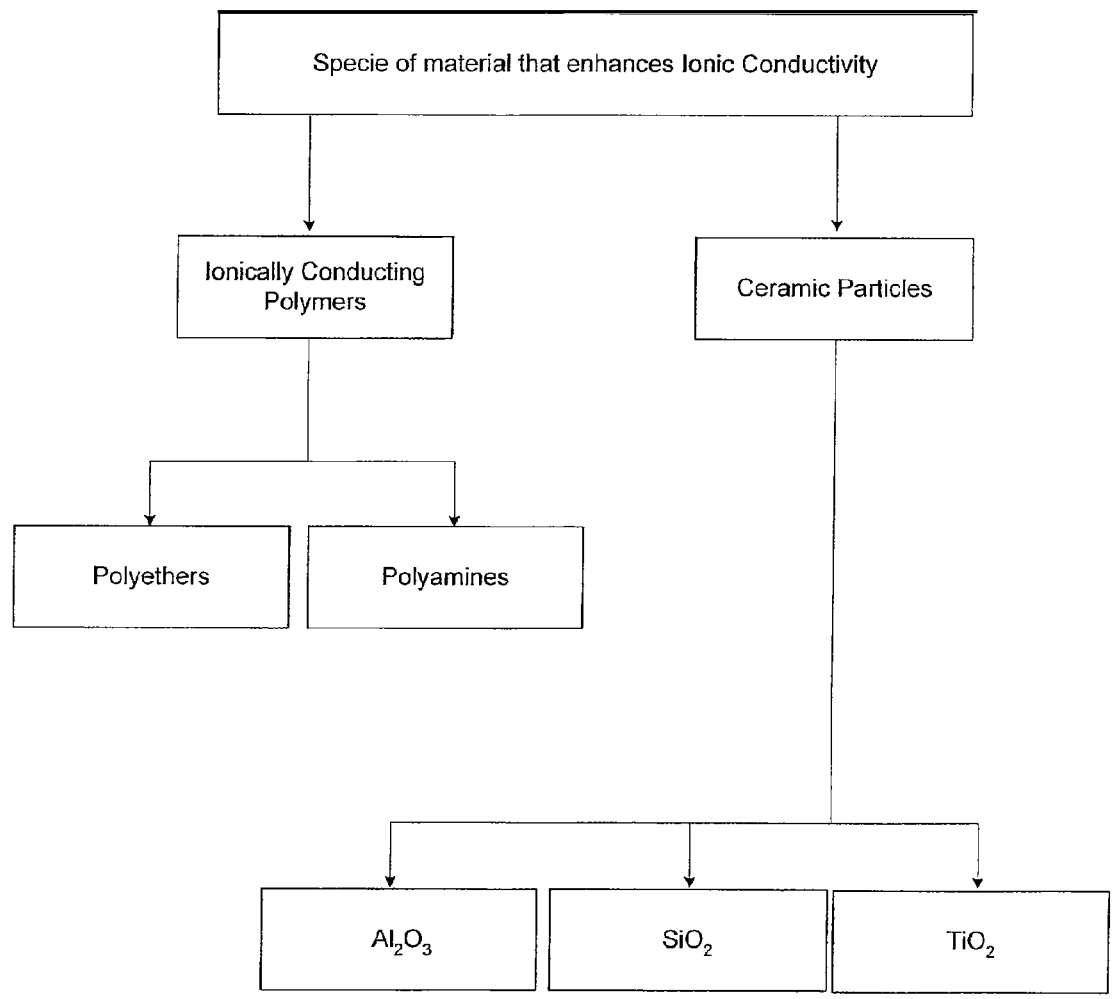
Figure 9I:
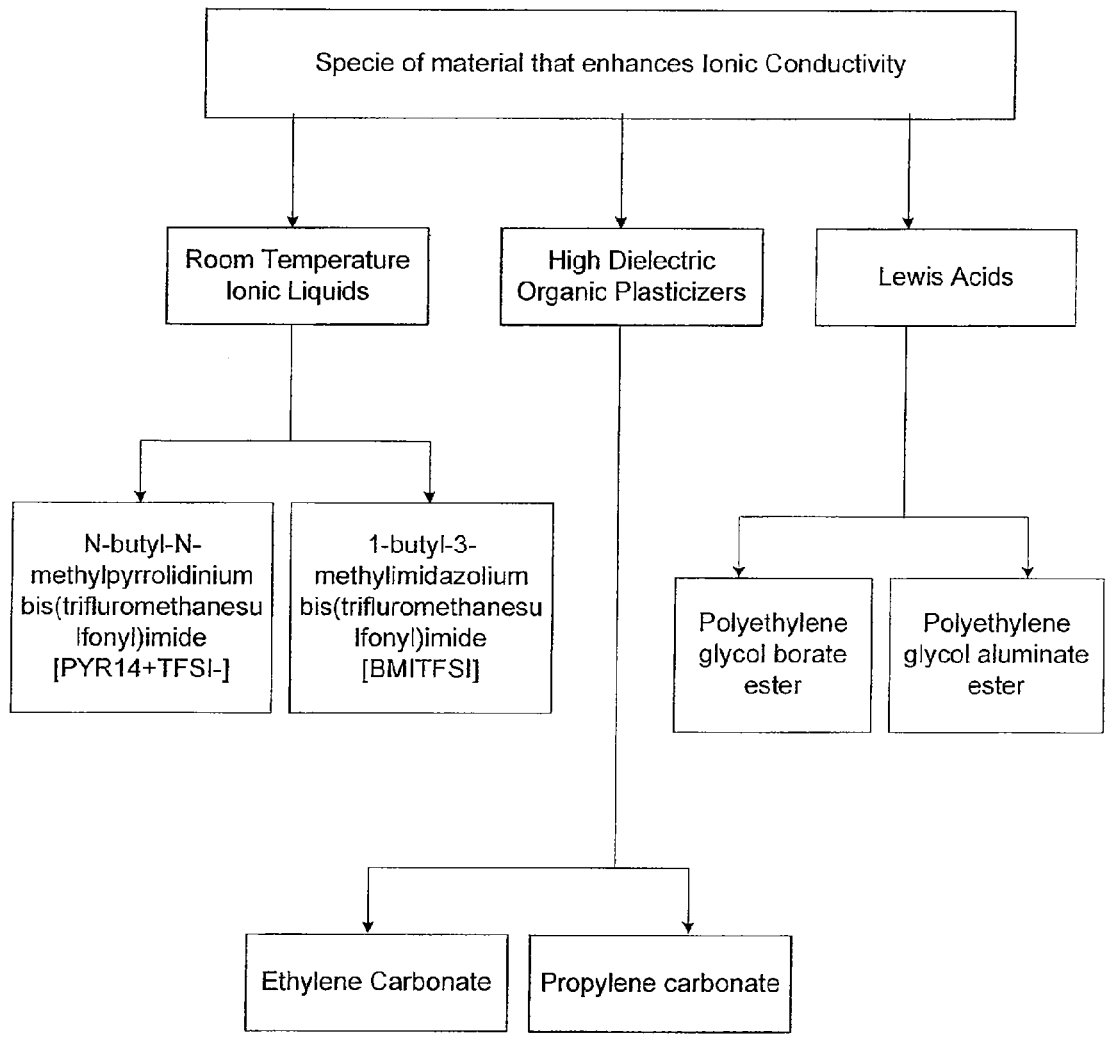

FIGS. 9H-9I are simplified illustrations showing the inclusion of an additive (specie) that enhances ionic conductivity. According to an embodiment, the additive that enhances ionic conductivity is included in the conductive domain. An exemplary electrolyte material including such an additive(s) may be characterized by an ionic conductivity of at least $1 \times 10^{-5}$ $Scm^{-1}$ at 25 degrees C. or characterized by an ionic conductivity of at least $1 \times 10^{-4}$ $Scm^{-1}$ at 25 degrees C., according to the embodiment. According to the embodiment, an additive can be an ionically conducting polymer. Polyethers are ionically conducting polymers. Polyamines are ionically conducting polymers. In one arrangement, the ionically conducting polymer has a molecular weight of at most 1,000 Daltons. In another arrangement, the ionically conducting polymer has a molecular weight of at most 500 Daltons.

According to the embodiment, the additive can be ceramic particles, such as $Al_2O_3$ particles, $TiO_2$ particles, and $SiO_2$ particles. In some arrangements, the particles are nanoparticles with no dimension larger than 10 nm. In other arrangements, the nanoparticles have no dimension larger than 5 nanometers.

In another embodiment, the additive is a room temperature ionic liquid. Examples of RTILs include N-butyl-N-methylpyrrolidinium bis(trifluoromethanesulfonyl)imide [PYR14+TFSI−] and 1-butyl-3-methylimidazolium bis(trifluoromethanesulfonyl)imide [BMITFSI].

In another embodiment, the additive is a high dielectric organic plasticizer(s). Examples of high dielectric organic plasticizers include ethylene carbonate and propylene carbonate.

In another embodiment, the additive is a Lewis acid(s). Examples of Lewis acids include polyethylene glycol borate ester and polyethylene glycol aluminate ester.

Figure 10:
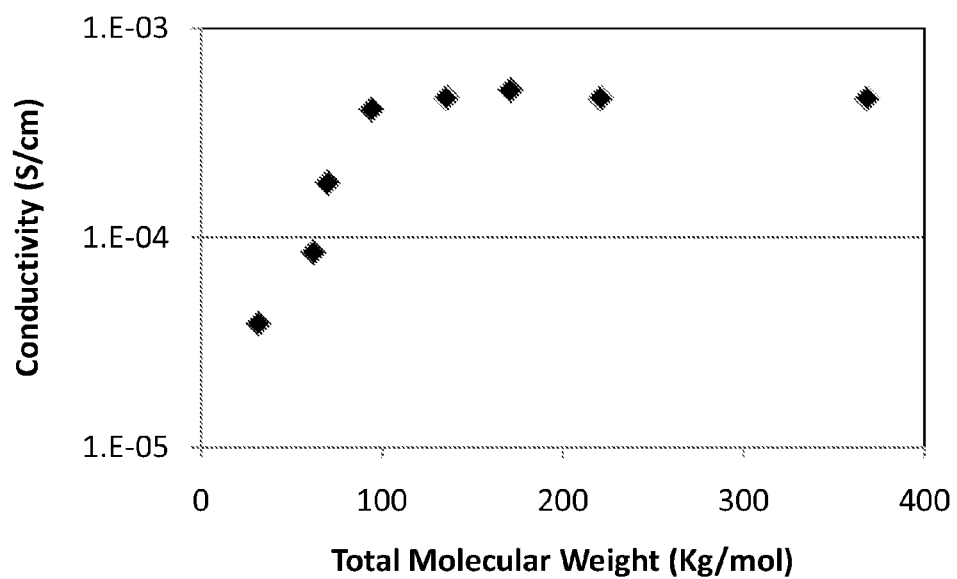
FIG. 10 is a plot of ionic conductivity as a function of molecular weight for an exemplary diblock copolymer electrolyte at 80 degrees C.

FIG. 10 is a plot of ionic conductivity as a function of molecular weight for an exemplary diblock copolymer electrolyte at 80 degrees C. The conductivity is higher for higher molecular weights and seems to reach a plateau at around 150,000 Daltons.

Figure 11:
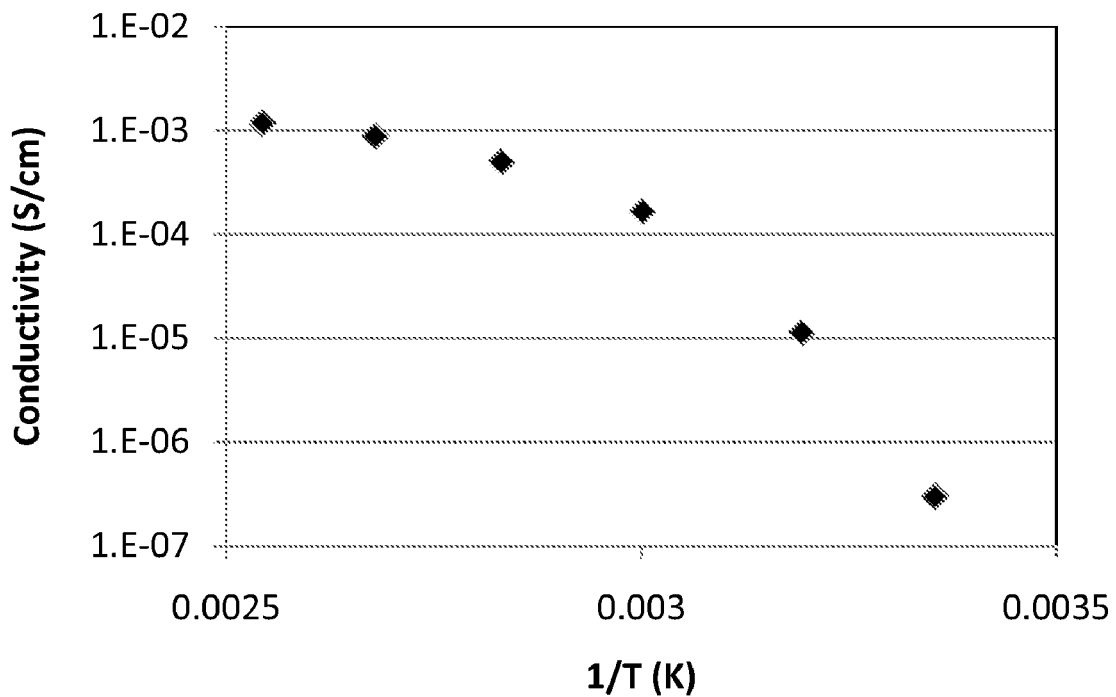
FIG. 11 is a plot of ionic conductivity as a function of inverse temperature for an exemplary diblock copolymer electrolyte that has a molecular weight of 350 kg/mole, according to an embodiment of the invention.

FIG. 11 is a plot of ionic conductivity as a function of inverse temperature for an exemplary diblock copolymer electrolyte that has a molecular weight of 350,000 Daltons, according to an embodiment of the invention.

In one embodiment of the invention, the linear diblock copolymer that makes up the conductive and structural domains of the electrolyte has a molecular weight of at least 150,000 Daltons. In another embodiment of the invention, the linear diblock copolymer that makes up the conductive and structural domains of the electrolyte has a molecular weight of at least 350,000 Daltons.

The following are examples of various processing techniques that can be employed to manufacture a solid electrolyte material according to embodiments of the invention. According to an embodiment, the domain structure is formed and maintained through kinetic control of the various phases, and in particular kinetic restriction of an otherwise thermodynamically favored phase separation. Disparate homopolymers blended in solution may form the desired domain structures through fast removal of solvent, and in some cases slight activation by then heating the dry polymer. To maintain the morphology, the material may then either be kept at low temperatures to prevent phase separation, or with variations of these homopolymers, covalent cross linking may be used to effectively freeze the morphological state.

According to another embodiment employing block-copolymer based electrolytes as described above, the morphology is maintained through covalent bonding between phases, and the specific morphology obtained is dependent on the composition, volume fraction, and molecular architecture of polymer. An exemplary method for synthesizing poly(styrene-block-ethylene oxide) (SEO) diblock copolymer includes synthesizing polystyrene (PS) as a first block and synthesizing ethylene oxide (EO) as a second block. The method includes distilling purified benzene into a reactor on a vacuum line and taking the reactor from the vacuum line into a glove box where an initiator such as s-butyllithium may be added. The method includes returning the reactor to the vacuum line to be degassed and distilling styrene monomers into the reactor.

The method includes heating the reactor to room temperature, stirring for at least six hours, and isolating an aliquot of living polystyrene precursors in the glove box for molecular weight determination. The method includes returning the reactor to the vacuum line to be thoroughly degassed and distilling a few milliliters of ethylene oxide into the degassed reactor. The method includes heating the reactor to a room temperature, stirring for two hours, taking the reactor back to the glove box, and adding a strong base in 1:1 molar ratio to an initiator. The method includes adding t-butyl phosphazene base (t-BuP4) as the strong base.

The method includes returning the reactor to the vacuum line to be thoroughly degassed, stirring at room temperature for 12 hours to allow the t-BuP4 to react with the ethylene oxide-terminated PS chains, and distilling a desired amount of ethylene oxide into the reactor using dry ice/isopropanol. The method includes heating the reactor to 50° C. and stirring for five days in a hot water bath. The method includes returning the reactor to the glove box, terminating the living SEQ diblock copolymer using methanol, and isolating the SEQ diblock copolymer by precipitation in hexane and vacuum freeze drying from benzene.

An exemplary method for making a poly(styrene-block-ethylene oxide-block-styrene) (SEOS) triblock copolymers is similar to the method of making SEQ as described above. However, instead of terminating the final polymer with methanol, dichlorodimethylsilane is preferably used as a bifunctional terminator. According to the embodiment, the bifunctional terminator couples two SEQ chains together to form SEOS chains.

The method includes, after the addition of the bifunctional terminator, allowing the reaction mixture to stir for 5 days to enable the slow reaction to proceed to completion. The method includes adding methanol to terminate any remaining living chains and isolating SEOS triblock copolymers by precipitation in hexane and vacuum freeze drying from benzene.

An exemplary method for synthesizing poly(ethylene oxide-block-styrene-block-ethylene oxide) (EOSEO) triblock copolymers is similar to the method for making SEQ as described above. However, instead of initiating the styrene with s-butyllithium, a bifunctional initiator is preferably used. According to the embodiment, the initiator allows the PS chain to grow from both chain ends. In a specific embodiment, potassium naphthalene in THF can be used as the bifunctional initiator.

According to an embodiment, an exemplary method further includes isolating an aliquot of the living polystyrene precursor in the glove box for molecular weight determination and returning the reactor to the vacuum line to be thoroughly degassed. The method includes distilling a few milliliters of ethylene oxide into the degassed reactor. The method includes heating the reactor to a room temperature, stirring for two hours, taking the reactor back to the glove box, and adding a strong base in 1:1 molar ratio to an initiator. The method includes adding t-butyl phosphazene base (t-BuP4) as the strong base. The method includes returning the reactor to the vacuum line to be thoroughly degassed, stirring at room temperature for 12 hours to allow the t-BuP4 to react with the ethylene oxide-terminated PS chains, and distilling a desired amount of ethylene oxide into the reactor using dry ice/isopropanol. The method includes heating the reactor to 50° C., stirring for five days in a hot water bath, and returning the reactor to the glove box. The method includes terminating the living EOSEO triblock copolymer using methanol and isolating the EOSEO triblock copolymer by precipitation in hexane and by vacuum freeze drying from benzene.

An exemplary method for synthesizing poly(isoprene-block-styrene-block-ethylene oxide) (ISEO) triblock copolymers includes synthesizing a polyisoprene block in benzene. The method includes distilling purified benzene into a reactor on a vacuum line, taking the reactor from the vacuum line into the glove box where an initiator such as s-butyllithium is added. The method includes returning the reactor to the vacuum line to be degassed, distilling the isoprene monomer into the reactor, stirring the mixture for at least six hours, and isolating an aliquot of the living polyisoprene precursor in the glove box for molecular weight determination.

The method includes returning the reactor to the vacuum line to be thoroughly degassed, distilling the styrene into the living polyisoprene solution and allowing the reaction to proceed for at least six hours to form polyisoprene-block-polystyrene living polymers. The method includes cooling the reactor with dry ice/isopropanol, distilling a few milliliters of ethylene oxide into the reactor, heating the reactor to room temperature, and stirring for two hours. The method includes taking the reactor to the glove box and adding a strong base in a 1:1 molar ratio to the initiator. The method includes adding t-butyl phosphazene base (t-BuP4) as the strong base.

The method includes returning the reactor to the vacuum line to be thoroughly degassed, stirring at room temperature for 12 hours to allow the t-BuP4 to react with the ethylene oxide-terminated PI-PS chains, and distilling a desired amount of ethylene oxide into the reactor using dry ice/isopropanol. The method includes heating the reactor to 50° C. and stirring for five days in a hot water bath. The method includes returning the reactor to the glove box, terminating the living ISEO triblock copolymers using methanol, and isolating the ISEO diblock copolymer by precipitation in hexane and vacuum freeze drying from benzene.

According to an embodiment for purifying benzene to make a solid electrolyte material, starting material benzene may be purchased from Aldrich. An exemplary method for purifying benzene includes stirring on freshly ground calcium hydride for at least eight hours in a long neck flask attached to a vacuum line. The method includes freezing the mixture of calcium hydride using liquid nitrogen and degassing the mixture under vacuum. The method includes distilling benzene out of the calcium hydride mixture onto a s-butyllithium purification stage, stirring the benzene on the s-butyllithium for at least eight hours, and degassing.

According to an embodiment for purifying styrene to make a solid electrolyte material, starting material styrene may be purchased from Aldrich. An exemplary purified styrene may be stored in a freezer prior to use. According to the embodiment, the method includes pouring styrene into a flask attached to the vacuum line, freezing and degassing. The method includes pipetting dibutylmagnesium (1.0 M in heptane) into a second flask in a glove box, adding ten mL of dibutylmagnesium for every 100 mL of styrene to purify. The method includes attaching the flask to the vacuum line, distilling the heptane out of the dibutylmagnesium flask, distilling the styrene onto the dibutylmagnesium, stirring the styrene on the dibutylmagnesium for at least eight hours, and thoroughly degassing.

According to an embodiment for purifying isoprene to make a solid electrolyte material, starting material isoprene may be purchased from Aldrich. An exemplary purified isoprene may be stored in a freezer prior to use. According to the embodiment, the method includes pouring isoprene into a long neck flask containing freshly ground calcium hydride, attaching the flaks to a vacuum line, and freezing and degassing. The method includes pipetting s-butyllithium (1.4 M in cyclohexane) into a second long neck flask, adding ten mL of s-butyllithium for every 100 mL of isoprene to purify, distilling the cyclohexane of the s-butyllithium flask, and distilling the isoprene into the dried s-butyllithium using dry ice/isopropanol as the coolant. The method includes removing the mixture from the dry ice and stirring without coolant for three minutes, ensuring that the flask is not left out of the cooling bath for longer than three minutes. The method includes freezing the mixture in liquid nitrogen, degassing, repeating the stirring/degassing procedure twice more to enhance purity, and distilling isoprene into a measuring ampoule to get the isoprene to be ready to use.

According to an embodiment for purifying ethylene oxide to make a solid electrolyte material, starting material ethylene oxide may be purchased from Aldrich. An exemplary method includes condensing ethylene oxide into a long neck flask containing freshly ground calcium hydride using dry ice/isopropanol as the coolant and freezing and degassing ethylene oxide, which may be stored in a gas cylinder in a refrigerator prior to use. The method includes stirring ethylene oxide for a minimum of eight hours on the calcium hydride while packed in dry ice/isopropanol, pipetting n-butyllithium into a second long neck flask, attaching the flask to the vacuum line and degassing.

The method includes adding ten mL of n-butyllithium in hexane for every 100 mL of ethylene oxide to purify, distilling hexane out of the n-butyllithium flask, and distilling ethylene oxide into the dried n-butyllithium using dry ice/isopropanol as coolant. The method includes removing and replacing a dry ice/isopropanol bath, stirring the mixture for 30 minutes at 0° C., and ensuring the mixture does not warm above 0° C. in order to prevent unsafe runaway reactions. The method includes distilling ethylene oxide out of the n-butyllithium into a measuring ampoule using dry ice/isopropanol as the coolant and keeping the ampoule at 0° C. to get the ethylene oxide to be ready to use.

According to an embodiment for purifying dichlorodimethylsilane to make a solid electrolyte material, starting material dichlorodimethylsilane may be purchased from Aldrich. According to the embodiment, the method includes stirring on freshly ground calcium hydride for at least eight hours in a long neck flask attached to a vacuum line. The method includes freezing the dichlorodimethylsilane and degassing thoroughly prior to use.

According to an embodiment, the final steps for preparing an electrolyte includes preparing, dissolving, and mixing polymers and the lithium salt in an effective solvent system. The solvent is removed either by freeze drying or evaporation to yield a dry polymeric material that can be molded or otherwise processed into film for use as an electrolyte. Alternatively, the polymer/salt solution may be cast (e.g. spin cast, solution cast, etc.) or printed (i.e. screen printed, ink-jet printed, etc.) or otherwise deposited to form a film. According to the embodiment, the desired domain structure and morphology naturally may arise upon removal of solvent. Alternatively, the desired domain structure and morphology may arise soon after slight activation of the material such as by heating of the dry polymer material.

According to an embodiment, the final steps for preparing an electrolyte that includes species that enhance ionic conductivity includes preparing, dissolving, and mixing polymers and the lithium salt and the conductivity-enhancing species in an effective solvent system. The solvent is removed either by freeze drying or evaporation to yield a dry polymeric material that can be molded or otherwise processed into film for use as an electrolyte. Alternatively, the polymer/salt/species solution may be cast (e.g. spin cast, solution cast, etc.) or printed (i.e. screen printed, ink-jet printed, etc.) or otherwise deposited to form a film. According to the embodiment, the desired domain structure and morphology naturally may arise upon removal of solvent. Alternatively, the desired domain structure and morphology may arise soon after slight activation of the material such as by heating of the dry polymer material.

In conclusion, the present invention provides various embodiments of material systems for a solid electrolyte material that is ionically conductive, mechanically robust, and manufacturable by conventional polymer processing methods. While these inventions have been described in the context of the above specific embodiments, modifications and variations are possible. Accordingly, the scope and breadth of the present invention should not be limited by the specific embodiments described above and should instead be determined by the following claims and their full extend of equivalents.

We claim:

1. An electrolyte material comprising:
a plurality of linear block copolymers wherein each of the plurality of linear block polymers comprises a first polymer block and a second polymer block different from the first polymer block, wherein;
a first end of the first polymer block and a first end of the second polymer block are bonded to one another covalently;
the first polymer block is an ionically-conductive polymer block, and a plurality of the ionically-conductive polymer blocks and a salt make up an ionically-conductive lamellar domain; and
the second polymer block is a structural polymer block, and a plurality of the structural polymer blocks make up a structural lamellar domain, wherein;
a plurality of the ionically-conductive lamellar domains and a plurality of the structural lamellar domains are configured as alternating layers; and
the conductive lamellar domains provide pathways for ion conduction through the electrolyte material.

2. The electrolyte material of claim 1 wherein the electrolyte material has an ionic conductivity of at least $1 \times 10^{-5}$ Scm$^{-1}$ at 90 degrees C.

3. The electrolyte material of claim 1 wherein the electrolyte material has an elastic modulus in excess of $1 \times 10^6$ Pa at 25 degrees C.

4. The electrolyte material of claim 1 wherein the electrolyte material has an elastic modulus in excess of $1 \times 10^6$ Pa at 90 degrees C.

5. The electrolyte material of claim 1 wherein the electrolyte material has an elastic modulus in excess of $1 \times 10^7$ Pa at 90 degrees C.

6. The electrolyte material of claim 1, wherein the electrolyte can be formed into a desirable shape using a standard technique selected from the group consisting of extrusion, molding, calendaring, casting, and printing.

7. The electrolyte material of claim 1 wherein the linear block copolymers are linear diblock copolymers.

8. The electrolyte material of claim 7 wherein the linear diblock copolymer has a molecular weight of at least 150,000 Daltons.

9. The electrolyte material of claim 7 wherein the linear diblock copolymer has a molecular weight of at least 350,000 Daltons.

10. An electrolyte material comprising:
a plurality of linear block copolymers wherein each of the plurality of linear block copolymers comprises a first polymer block, a second polymer block different from the first polymer block, and a third polymer block, wherein;
the first polymer block is an ionically-conductive polymer block, and a plurality of the ionically-conductive polymer blocks and a salt make up an ionically-conductive lamellar domain; and
the second polymer block is a structural polymer block, and a plurality of the structural polymer blocks make up a structural lamellar domain;
a plurality of the third polymer blocks make up a third lamellar domain, and wherein;
a plurality of the ionically-conductive lamellar domains, a plurality of the structural lamellar domains, and a plurality of the third lamellar domains are configured as alternating layers; and the conductive lamellar domains provide pathways for ion conduction through the electrolyte material.

11. The electrolyte material of claim 1 wherein the linear block copolymers are linear triblock copolymers.

12. The electrolyte material of claim 11 wherein each of the plurality of linear triblock polymers comprises the first polymer block, the second polymer block, and a third polymer block.

13. The electrolyte material of claim 10 wherein a first end of the first polymer block is bonded covalently to a first end of the second polymer block and a first end of the third polymer block is bonded covalently to a second end of the second polymer block.

14. The electrolyte material of claim 11 wherein the linear triblock copolymer has a molecular weight of at least 250,000 Daltons.

15. The electrolyte material of claim 11 wherein the linear triblock copolymer has a molecular weight of at least 400,000 Daltons.

16. The electrolyte material of claim 1 wherein at least one of the ionically-conductive lamellar domain and the structural lamellar domain further comprises a plurality of perforations.

17. The electrolyte material of claim 16, wherein the ionically-conductive lamellar domain has a larger volume than the structural lamellar domain, and wherein the ionically-conductive lamellar domain fills the perforations in the structural lamellar domain.

18. The electrolyte material of claim 16 wherein the structural lamellar domain has a larger volume than the ionically-conductive lamellar domain, and wherein the structural lamellar domain fills the perforations in the ionically-conductive lamellar domain.

19. The electrolyte material of claim 16 wherein the perforations have a height between about 5 and 100 nanometers.

20. The electrolyte material of claim 16 wherein the perforations have a center-to-center spacing of between about 5 and 100 nanometers on average.

21. The electrolyte material of claim 1 wherein the ionically-conductive linear polymer blocks comprise a material selected from the group consisting of polyethers, polyamines, and combinations thereof.

22. The electrolyte material of claim 21 wherein the ionically-conductive linear polymer blocks comprise polyethylene oxide.

23. The electrolyte material of claim 1 wherein the structural polymer blocks comprise a non-ionic-conducting polymer with a bulk modulus greater than $10^{-7}$ Pa at 90 degrees C.

24. The electrolyte material of claim 1 wherein the structural polymer blocks comprise a component selected from a group comprising styrene, methacrylate, vinylpyridine, vinylcyclohexane, imide, amide, propylene, alphamethylstyrene and combinations thereof.

25. The electrolyte material of claim 1 wherein the ionically-conductive linear polymer blocks and the structural polymer blocks each has a molecular weight of at least 50,000 Daltons.

26. The electrolyte material of claim 1 wherein the ionically-conductive polymer blocks and the structural polymer blocks each has a molecular weight of at least 100,000 Daltons.

27. The electrolyte material of claim 1 wherein the salt comprises a lithium salt.

28. The electrolyte material of claim 1 wherein the ionically-conductive lamellar domain further comprises an additive that enhances ionic conductivity.

29. The electrolyte material of claim 28 wherein the additive comprises ceramic nanoparticles selected from the group consisting of $Al_2O_3$, $TiO_2$, and $SiO_2$ nanoparticles particles.

30. The electrolyte material of claim 28 wherein the additive comprises an ionically conducting polymer.

31. The electrolyte material of claim 28 wherein the additive comprises a room temperature ionic liquid.

32. The electrolyte material of claim 28 wherein the additive comprises a high dielectric organic plasticizer.

33. The electrolyte material of claim 28 wherein the additive comprises one or more Lewis acids.

34. The electrolyte material of claim 28 wherein the electrolyte material has an ionic conductivity of at least $1\times10^{-5}$ $Scm^{-1}$ at 25 degrees C.

35. The electrolyte material of claim 28 wherein the electrolyte material has an ionic conductivity of at least $1\times10^{-4}$ $Scm^{-1}$ at 25 degrees C.

36. The electrolyte material of claim 10 wherein a first end of the first polymer block is bonded covalently to a first end of the second polymer block and a first end of the third polymer block is bonded covalently to a second end of the first polymer block.

37. The electrolyte material of claim 10 wherein the electrolyte material has an ionic conductivity of at least $1\times10^{-5}$ $Scm^{-1}$ at 90 degrees C.

38. The electrolyte material of claim 10 wherein the electrolyte material has an elastic modulus in excess of $1\times10^6$ Pa at 25 degrees C.

39. The electrolyte material of claim 10 wherein the electrolyte material has an elastic modulus in excess of $1\times10^6$ Pa at 90 degrees C.

40. The electrolyte material of claim 10 wherein the electrolyte material has an elastic modulus in excess of $1\times10^7$ Pa at 90 degrees C.

41. The electrolyte material of claim 10 wherein the third lamellar domain has a volume between about 2% to 20% of the sum of the volumes of the ionically-conductive lamellar domain and the structural domain.

42. The electrolyte material of claim 10 wherein a first end of the first polymer block is bonded covalently to a first end of the third polymer block and a second end of the third polymer block is bonded covalently to a first end of the second polymer block.

43. The electrolyte material of claim 10 wherein the third polymer block comprises a rubbery polymer.

44. The electrolyte material of claim 10 wherein the third polymer block is selected from the group consisting of polysiloxanes, polyacrylates, and polydienes.

45. The electrolyte material of claim 13 wherein the third polymer block is the same as the first polymer block.

\* \* \* \* \*